US011321337B2

(12) United States Patent
Nucci et al.

(10) Patent No.: US 11,321,337 B2
(45) Date of Patent: May 3, 2022

(54) CROWDSOURCING DATA INTO A DATA LAKE

(71) Applicant: Cisco Technology, Inc., San Jose, CA (US)

(72) Inventors: Antonio Nucci, San Jose, CA (US); Ahmed Khattab, San Jose, CA (US); Carlos M. Pignataro, Cary, NC (US); Ravi K. Papisetti, Leander, TX (US); Prasad Potipireddi, San Ramon, CA (US); Richard M. Plane, Wake Forest, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 607 days.

(21) Appl. No.: 16/203,725

(22) Filed: Nov. 29, 2018

(65) Prior Publication Data

US 2019/0370263 A1 Dec. 5, 2019

Related U.S. Application Data

(60) Provisional application No. 62/732,763, filed on Sep. 18, 2018, provisional application No. 62/680,074, filed on Jun. 4, 2018.

(51) Int. Cl.
G06F 16/25 (2019.01)
G06F 16/21 (2019.01)
G06F 21/62 (2013.01)
G06F 16/2458 (2019.01)
G06F 16/383 (2019.01)
G06F 16/2457 (2019.01)

(52) U.S. Cl.
CPC .......... *G06F 16/254* (2019.01); *G06F 16/211* (2019.01); *G06F 16/2471* (2019.01); *G06F 16/24578* (2019.01); *G06F 16/258* (2019.01); *G06F 16/383* (2019.01); *G06F 21/6254* (2013.01)

(58) Field of Classification Search
CPC .. G06F 16/254; G06F 16/2471; G06F 16/211; G06F 16/258; G06F 16/24578; G06F 16/383; G06F 21/6254
See application file for complete search history.

(56) References Cited

U.S. PATENT DOCUMENTS

| 8,024,339 | B2 | 9/2011 | Barker et al. |
| 10,909,120 | B1* | 2/2021 | Mohamad ............. G06F 16/258 |
| 2004/0054569 | A1* | 3/2004 | Pombo ............... G06Q 30/0601 |
| | | | 705/7.27 |

(Continued)

OTHER PUBLICATIONS

Knowledgent Group Inc., "How to Design a Successful Data Lake", https://knowledgent.com/whitepaper/design-successful-data-lake/, downloaded Aug. 20, 2018, 13 pages.

*Primary Examiner* — Tamara T Kyle
*Assistant Examiner* — Lahcen Ennaji
(74) *Attorney, Agent, or Firm* — Edell, Shapiro & Finnan, LLC

(57) ABSTRACT

A Services Delivery Platform (SDP) architecture is provided that is configured to onboard new data sets into an SDP data lake. The SDP enables the crowdsourcing of data onboarding by configuring this process into an interactive, intuitive, step-by-step guided workflow while governing/controlling key functions like verification, acceptance and execution.

20 Claims, 20 Drawing Sheets

(56) References Cited

U.S. PATENT DOCUMENTS

| | | | |
|---|---|---|---|
| 2006/0155581 A1* | 7/2006 | Eisenberger | G06F 16/958 705/3 |
| 2008/0027830 A1* | 1/2008 | Johnson | G06Q 30/0625 705/14.68 |
| 2012/0130966 A1* | 5/2012 | Schmeink | G06F 16/25 707/705 |
| 2014/0310231 A1* | 10/2014 | Sampathkumaran | G06F 16/254 707/602 |
| 2016/0063514 A1 | 3/2016 | Srivastava et al. | |
| 2017/0053295 A1 | 2/2017 | Tiell et al. | |
| 2018/0018706 A1 | 1/2018 | Tognetti | |
| 2018/0232407 A1* | 8/2018 | Hemachandran | G06F 16/2365 |
| 2018/0234510 A1* | 8/2018 | Sharma | H04L 41/5051 |
| 2019/0286620 A1* | 9/2019 | Al-Haimi | G06N 3/0454 |

* cited by examiner

Data-Onboarding

Source Data Repository — ① Source Data Selection — ② Source Data Repository — ③ Destination Data Repository — ④ Destination Data Enrichment Data Onboarding Application Name
IBES_June6th Description
IBES Data Trustee
[rpapiset ⊗] ⊕

Custodian
[rpapiset ⊗] ⊕

Source Repository Type — 602
[Relational ▾]

Database Driver — 604
[Oracle ▾]

Connection String — 605
[jdbc:oracle:thin:@ldap://ldap-lprd]

User Name — 606
[IBNG_APPL]

Password
[*******]

Source Schema Name — 608
[CORE_FNZ_ADMIN]

( Cancel )  ( Save )

Step 1: "Source Data Repository"
FIG. 8A

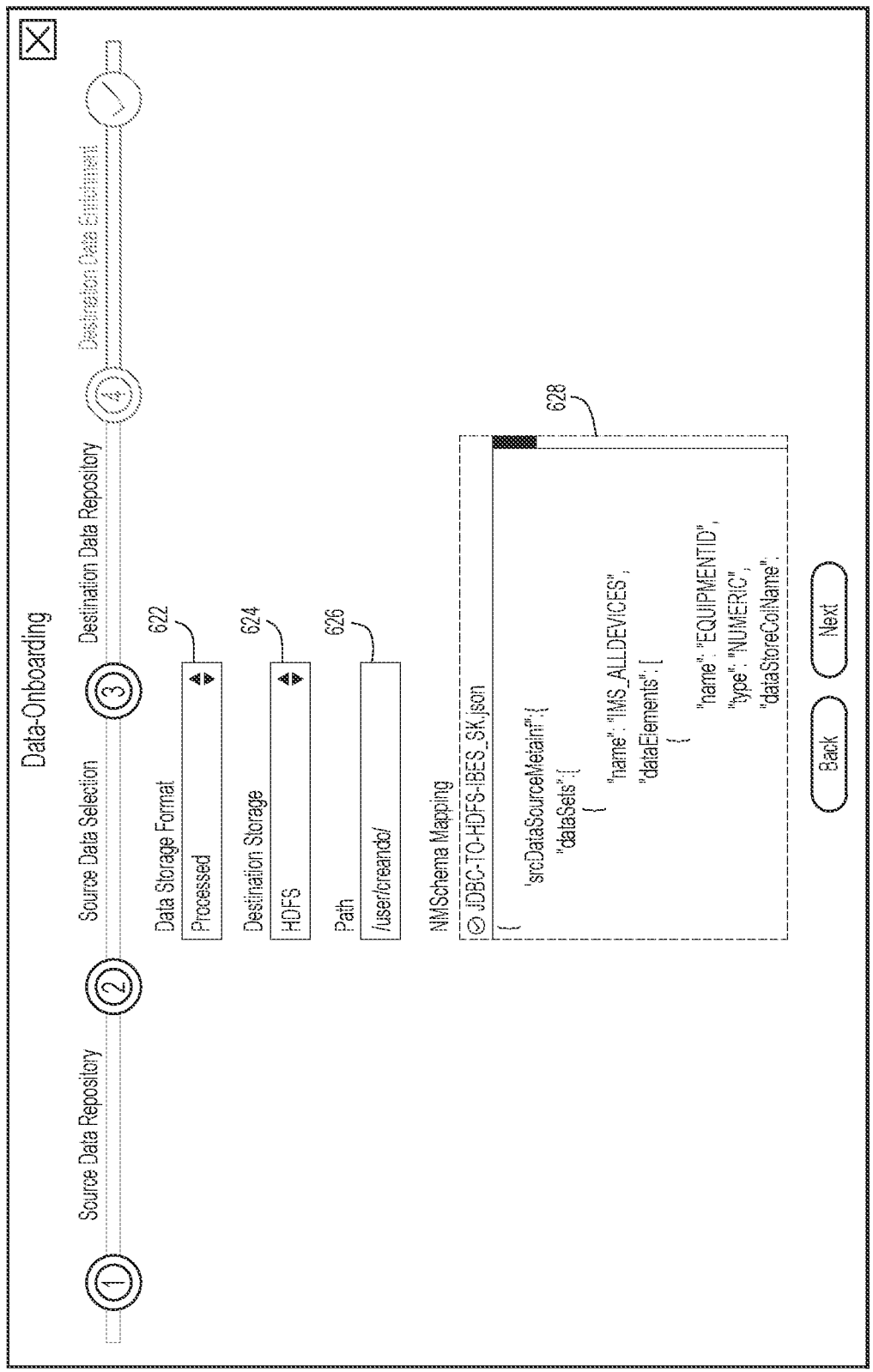
FIG. 8C Step 3: "DESTINATION DATA REPOSITORY"

Step 4: "DESTINATION DATA ENRICHMENT"

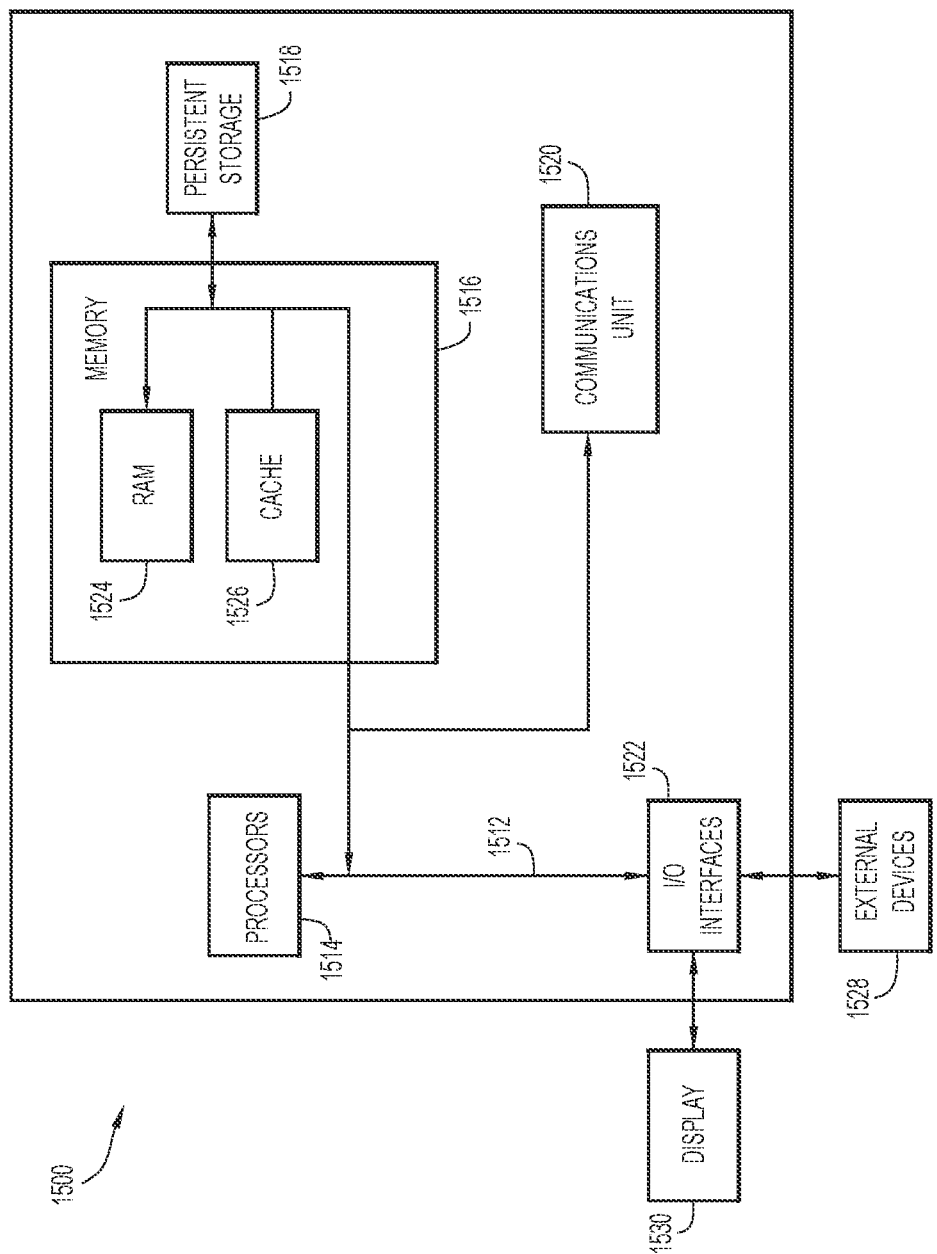

CROWDSOURCING DATA INTO A DATA LAKE

PRIORITY CLAIM

This application claims priority to U.S. Provisional Application No. 62/732,763, filed Sep. 18, 2018, and to U.S. Provisional Application No. 62/680,074, filed Jun. 4, 2018. The entirety of each of these applications is incorporated herein by reference.

TECHNICAL FIELD

The present disclosure relates to distributed computing systems.

BACKGROUND

Data lakes are enterprise-wide data management platforms that store disparate sources of data in a native format, until such time as the data is queried for analysis. The utility of a data lake is that by consolidating data, one can remove the information silos created by having independently managed collections of data, thereby increasing information use and sharing. Other benefits include lower costs through server and license reduction, reduced cost scalability, flexibility for use with future systems, and the ability to keep the data until there is a use for it. While these benefits can be convincing to companies, heretofore data lakes have created more problems than they solve.

The flaws are many and the risks substantial. For a start, data lakes lack semantic consistency and governed metadata, increasing the degree of skill of users looking to find the data they want for manipulation and analysis. Simply put, companies still lack expertise among their business users to actually use data lakes. The marketing for many data lake products often seems to suggest that all users can dip into data lakes and pull out insights as if they are an arcade game, which simply is not true, and this is leading to a great deal of disillusionment.

Another major deficiency of data lakes involves the quality of the data. The entire point of a data lake is that it pulls in any data, in any format, with no governance. With no restrictions on the cleanliness of the data, there is real potential that it will eventually turn into a data swamp. This lack of governance also leads to security issues. Companies may not even know where the data they are collecting comes from, what kind of data it is, and the regulatory requirements around its privacy. Companies cannot just store all their data where and how they please. There are rules, and the security around data lakes is often lacking. The protection of data is vital to a company's reputation, and it involves strict governance. Otherwise, companies are leaving themselves wide open to all types of privacy risks. Furthermore, the lack of a broadly used data schema makes the correlation of different data sets cumbersome for any technical and business user.

BRIEF DESCRIPTION OF THE DRAWINGS

FIGS. 8A-8D are diagrams depicting the steps of the data onboarding process, according to an example embodiment.

FIG. 17 is a block diagram of a remote compute node or central compute node configured to perform the operations presented herein, according to an example embodiment.

DESCRIPTION OF EXAMPLE EMBODIMENTS

Overview

Figure 1:
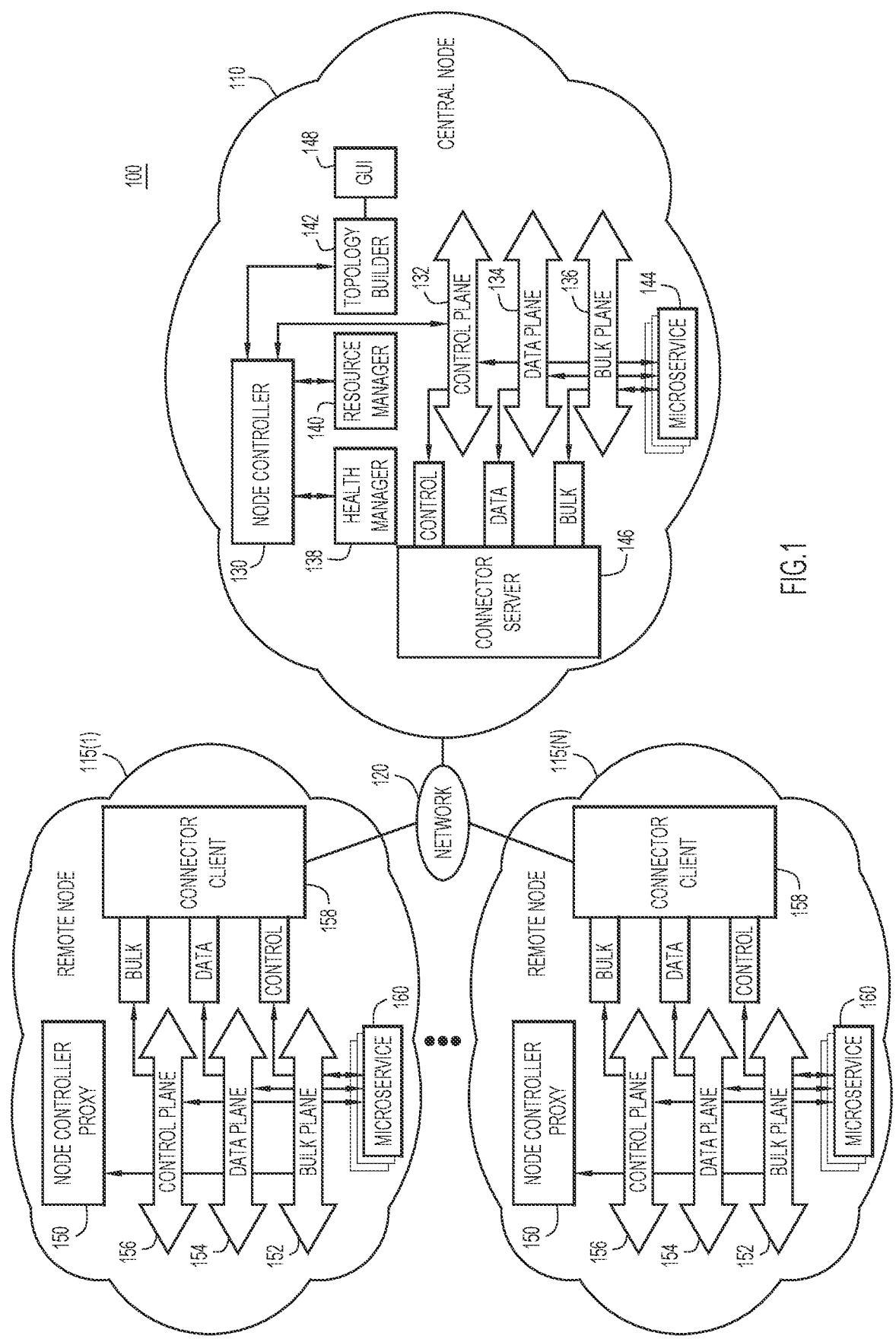
FIG. 1 is a high-level block diagram of a Services Delivery Platform (SDP) system according to an example embodiment.

Presented herein is a Services Delivery Platform (SDP) architecture configured to onboard new data sets into an SDP data lake. The SDP enables the crowdsourcing of data onboarding by configuring this process into an interactive, intuitive, step-by-step guided workflow while governing/controlling key functions like verification, acceptance and execution.

In one embodiment, a method is provided that is performed at a central compute node in a distributed computing system that includes a plurality of remote compute nodes whose computing resources and software functions are made available in a platform agnostic matter to users of the distributed computing system. The method includes the central compute node obtaining from a remote compute node a request to onboard at least one data set to a data lake of the distributed computing system. The central compute node also obtains from the remote compute node information about the at least one data set available from a source repository, the information including database type and schema of the at least one data set. Moreover, the central compute node obtains information about a destination repository for the at least one data set in the data lake managed by the distributed computing system. Based on the information about the at least one data set and the information about the destination repository, the central compute node determines a mapping scheme that describes a transformation from the schema of the at least one data set to a unified data schema for the distributed computing system. The central compute node copies data for the at least one data set to the destination repository in the distributed computing system, and transforms the data of the at least one data set according to the mapping scheme.

Example Embodiments

Presented herein is a system and methods associated with a distributed computing system architecture configured to distribute application building blocks, such as microservices, in a deployment-agnostic manner. The system includes an SDP Central Node and numerous SDP Remote Nodes. The SDP system serves as an applications enablement platform to build, compose and distribute extremely scalable analytics applications that use machine learning libraries, batch processing frameworks, custom data processing applications and a microservice architecture. The SDP integrates streaming (data in-motion) and batch (data at-rest) data from multiple sources, in addition to human and machine generated intellectual capital, to deliver scalable analytics applications. Microservices are core capabilities that have been broken down into autonomous modules that interoperate with each other, utilize an integrated data fabric, and are reusable across all platform layers and application service offerings.

The platform employs the concept of a logical entity that represents computing resources for executing computing processes. It provides an architecture that makes the distributed application building blocks, such as microservices, deployment-agnostic. The SDP system provides two different concepts of these runtime environments, which are referred to as SDP Nodes. A node could be a Central Node, which employs all SDP capabilities, such as streaming batch and machine learning, or a Remote Node, which is a scaled down representation of an SDP runtime environment that hosts only data-in-motion capabilities, with limited analytical features, i.e. microservices. Remote nodes are typically deployed to the fog and edge elements of the network.

The SDP is a unified software system that enables an enterprise to adapt quickly with new innovations while optimizing their existing investment. This is supported by providing onboarding, integration and availability of data, as well as the ability to identify, extract and operate on different types of data, using platform capabilities in terms of building blocks, such as machine learning and microservices. One goal is to provide application developers and enterprises, with a common set of tools and capabilities that can be leveraged, reused, shared and integrated without the need of highly specialized skills, such as machine learning experts or data scientists to use the platform. The platform enables developers to focus on their business logic implementation, while using highly customizable building blocks and features.

The SDP system is first described in general with reference to FIGS. 1-4. Reference is first made to FIG. 1. FIG. 1 shows a high-level software functional block diagram of the SDP system 100. The SDP system 100 includes a central compute node (central node) 110 and a plurality of remote compute nodes (remote nodes) 115(1)-115(N). In general, an SDP node is a compute environment (consisting of 1 or more hosts) where SDP data processing takes place. The end-to-end SDP system 100 consists of the central node 110 and supports zero or more remote nodes 115(1)-115(N) connected to it. The central node 110 communicates with the remote node nodes 115(1)-115(N) by way of network 120.

The central node 110 includes a node controller 130, a control plane 132, a data plane 134, a bulk plane 136, a health manager 138, resource manager 140 and topology builder 142. The central node 110 also runs one or more microservices shown at 144. There is also a connector server function 146 that enables persistent or on-demand connectivity between the central node 110 and one or more remote nodes 115(1)-115(N). An example graphical user interface (GUI) of a topology is shown at 148.

In one representation, the central node 110 may be a cloud computing entity (data center) and it may be a cluster of compute hosts (physical/virtual) that scales with compute resources. The central node 110 enables bidirectional and secure connectivity with the remote nodes 115(1)-115(N), and integrates with existing enterprise assets via connectors and a connector framework. The central node 110 enables streaming and batch analytics, data exploration tools, as well as machine learning/artificial intelligence (ML/AI) capabilities. The central node 110 provides many services, including software lifecycle management, assets management, workflow orchestration and scheduling, Application Programming Interfaces (APIs), development and deployment studios and a data lake functionality.

The remote node could be a Docker™ container, a bare metal computing apparatus, or a virtual machine. The remote node could be a single compute apparatus or a cluster of computing devices, like a data center. The resources offered by the remote node are identified. The computing power and memory of the remote node is the only limit as to the business logic that could run on a given remote node. All of this is determined for a remote node when it is onboarded to the SDP ecosystem.

Each remote node 115(1)-115(N) includes a node controller proxy 150, a control plane 152, a data plane 154, a bulk plane 156, a connector client 158 and one or more microservices 160. The node controller proxy runs at every remote node and performs local management of all microservices running at its node location. It interacts with, and carries out, command execution relayed by the node controller 130 running at the central node 110.

Logically, every SDP remote node has a resource manager, such as the resource manager 140 shown for the central node 110 in FIG. 1. Depending on the size of the remote node, and the services running there, the resource management function may be simplified and/or statically defined (e.g. deploying an SDP remote node using a Raspberry Pi host where only a few microservices are running at that node).

For the control plane and data planes that exist at the central node 110, there also exists a separate set of control, data and bulk plane segments at each remote node 115(1)-115(N) as shown in FIG. 1 and described herein. Each control, data and bulk plane segment is powered by a local message bus infrastructure, but is connected seamlessly back to the central node 110 via the connector 158 client.

The SDP system 110 enforces a clear separation between logical communication planes by provisioning three distinct planes for data, control and bulk data exchange, as shown in FIG. 1.

A main design principle behind employing three different logical planes, is that the traffic in one plane cannot affect the traffic in the other planes. Also, the three segregated planes also ensure that platform-specific commands, such as microservice life-cycle-management commands (i.e. start, stop, suspend, resume and health metrics collection commands)

are always delivered to platform and application components, regardless of the current overall processing load of the platform. Thus, the control plane can still operate if the data plane is down. During deployment, SDP system 100 configures redundant messaging (i.e. Kafka) clusters for providing high availability support. Since each plane will have its own cluster of distributed streaming platform brokers, e.g., Kafka® (by Apache Software Foundation) brokers, the planes can be configured to have a different number brokers in the cluster to meet different traffic demands of the other planes.

In the SDP system 100, the data plane is used as the main channel for transferring and processing application data. This includes periodic file uploads and real-time data streaming (e.g. stream of Simple Network Management Protocol (SNMP) traps or Netflow data). The data plane would typically have multiple microservices stitched together in order to transfer data from a data producer to a data consumer. Data flowing through multiple microservices may undergo multiple transformations, processing, and enrichment until it reaches a destination. Data flows may be defined with the microservice topologies. It is assumed that at the entry point into the system, data would be parsed and mapped to some normalized format. Participation in the data plane is optional. For example, there can be an Extraction, Transformation and Loading (ETL) microservice that takes data from one data repository, pushes the data through some kind of transformation, and then stores the data into another repository. In this case, there is no need for a topology and a data plane.

In the SDP system, the control plane has a two-fold purpose:

1. To perform control functions. These include start, stop, restart microservice, health monitoring, logging etc. Every microservice reports its health status on the control plane at the preconfigured interval. There is a default implementation of the health reporting (for example, a default implementation provides some statistics like number of messages processed per second or Java Virtual Machine (JVM) free heap size).

2. To send requests to the microservices to perform some business functions, for example, to initiate discovery, or to perform collection (on-demand or scheduled). This is also referred to as a command function of the control plane.

Every microservice is part of the control plane.

The bulk plane is a third plane, which is a special case of the data. As the name indicates, it is used as a channel for transferring a large amount of data. It is used to optimize the use and speed of transfer for regular streaming data, which uses the data plane. This plane is dedicated for file transfer, which is available for SDP microservices with requirements to transfer files between different SDP nodes.

Figure 2:
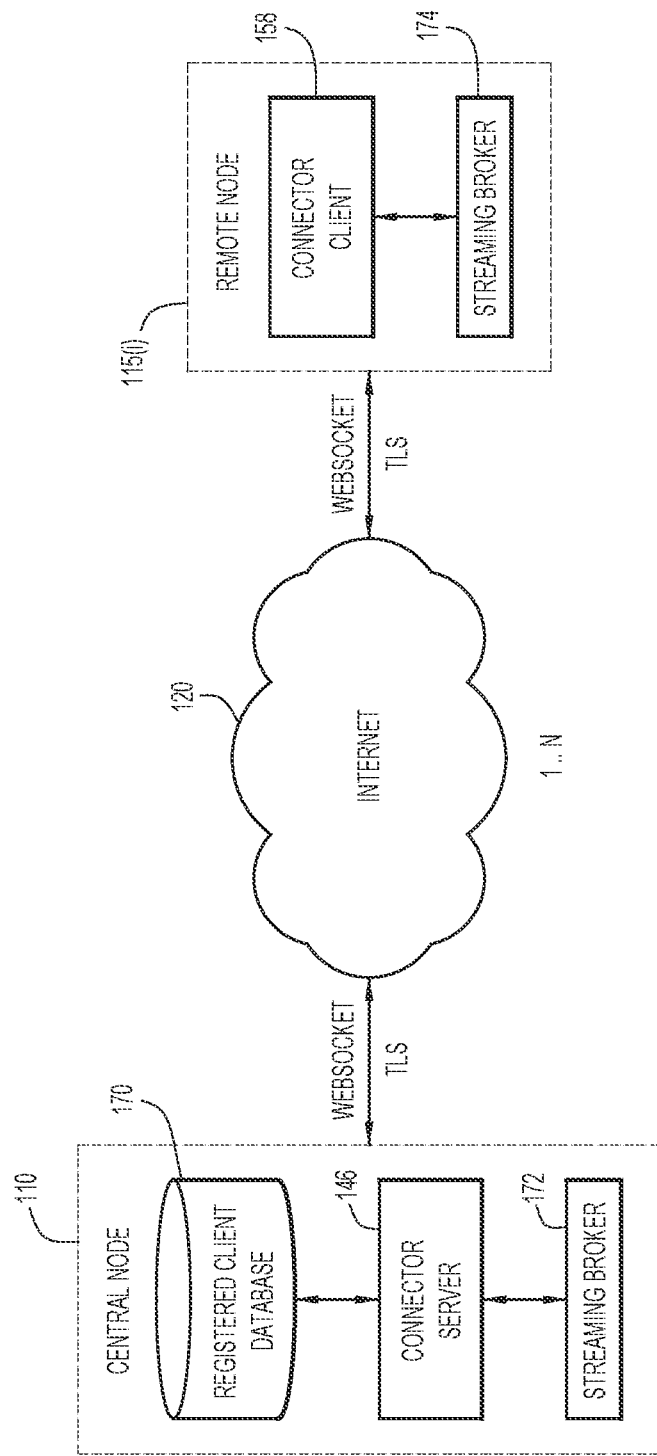
FIG. 2 is a block diagram illustrating a client-server based architecture of the SDP system, according to an example embodiment.

Reference is now made to FIG. 2. The connector function is a core component, and may be based on a client-server architecture. The main responsibility of the connector function is to handle the secure bi-directional communication channel between the central node 110 and any connected SDP remote nodes, shown at reference numeral 115(*i*).

The communications may take place over secured, such as Transport Layer Security (TLS) bi-directional websocket channel. The connector server 146 on the central node 110 acts as a connector server and the connector 158 acts as a connector client. There is a registered client database 170 at the central node 110 to govern communication with only registered remote nodes as "clients". The connector server 146 and connector clients 158 rely on streaming brokers (e.g., Kafka brokers) 172 and 174, respectively, as messaging backends.

The connector server 146 may be a wrapper over the JSR 356 websocket standard to which connector clients 158 can connect. This component is deployed on the central node 110, but can also be deployed in any other site that wants to act as a server.

The connector server 146 performs the following functions:

Listens for websocket connection requests from the connector client 158.

Authenticates the connection request against a list of registered clients in database 170.

Starts sending and receiving data to/from the connector client 158.

The connector client 158 has the same set of functions but instead of authenticating connections, it sends an authentication token to the connector server 146. Both components implement a keep-alive and reconnection mechanism to maintain a continuous connection.

The connector server 146 and connector client 158 support sending two types of data: streaming data and bulk data. Streaming data is mainly used for communication between SDP microservices and bulk data is used for transferring large files between nodes. In case of an interrupted connection, the connector functions will resume data transfer from the last offset once the connection is restored. The connector functions implement a fair policy mechanism to ensure the connection bandwidth is equally shared among concurrent connections. The connector server 146 also collects metrics, including but not limited to: the number of active client connections and the number of messages sent/received from both ends. The connector server 146 supports a pluggable authentication module (PAM) which can be extended to support more authentication mechanisms other than the out-of-the-box Hypertext Transfer Protocol (HTTP) basic authorization and JSON Web Tokens. The connector server 146 may also support HTTP and SOCKS5 proxies.

Figure 3:
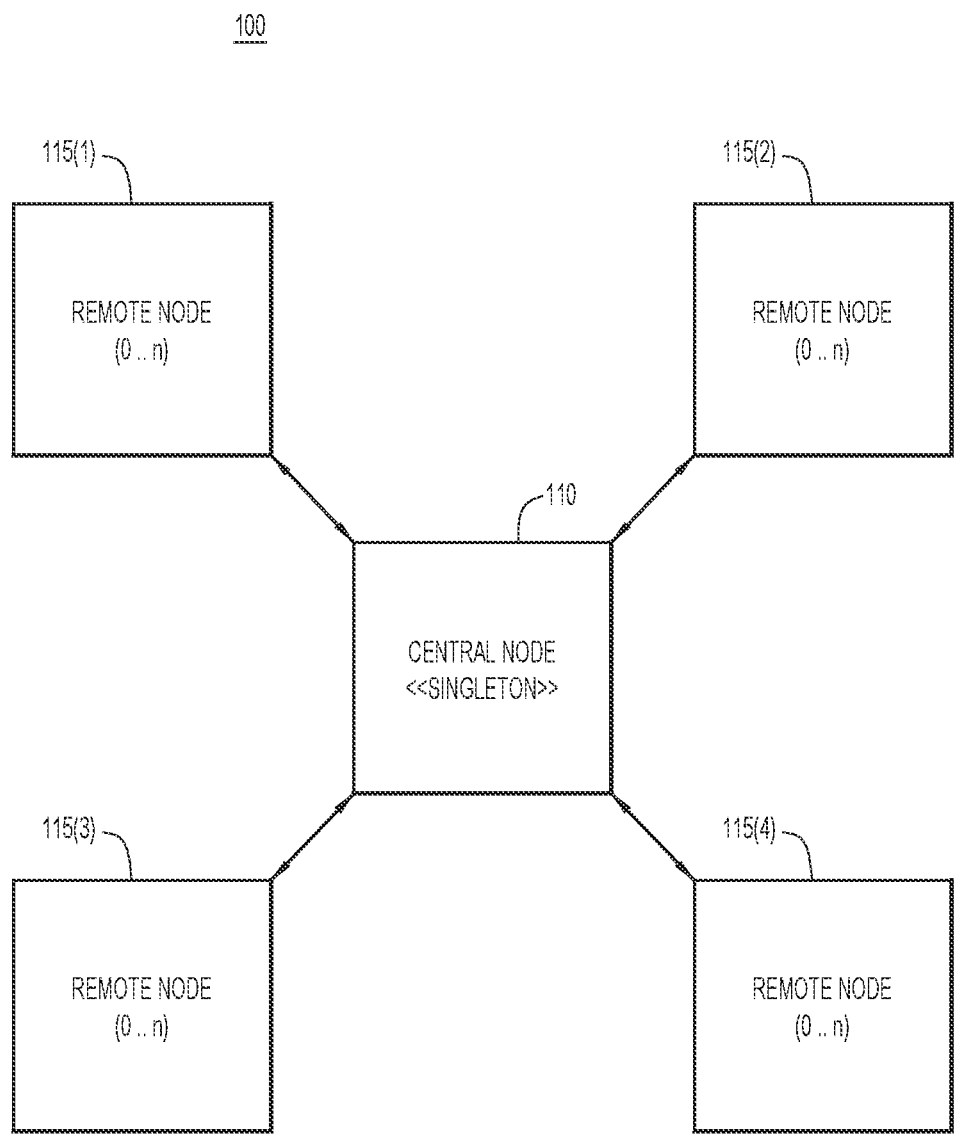
FIG. 3 is a diagram illustrating communication between an SDP central node and SDP remote nodes, according to an example embodiment.

Reference is now made to FIG. 3. A node is considered a compute environment, which may consist of one or more hosts, where SDP data processing takes place. In any SDP installation, there exists one—and only one—centralized controlled node, central node 110, and zero or more compute environments, with deployed subset of SDP capabilities, remote nodes 115(1)-115(4) in the example configuration shown in FIG. 3. As depicted in the overall logical architecture diagram of FIG. 3, the SDP system 100 provides core connectivity components that enable bi-directional communication of data and control messages between remote node(s) and the central node.

The remote nodes may connect to the central node using a star logical topology for exchanging both data and control messages. While the control channel is kept always-on to manage the remote node resources and business logic microservices/workflows, the data channels—both data streaming and file uploads—can be kept always-on, disconnected with no data exchanges between remote nodes and central node, or activated based on a pre-scheduled time or event policy. The topology may be expanded to a fully meshed topology, which allows remote nodes to collaborate in an exchange of data and process execution without the need to go through the central node. This will deliver a faster-time-to-action and reduce even further the network congestion whenever data exchanges and analytics can be completely executed via the pool of deployed remote nodes.

Figure 4:
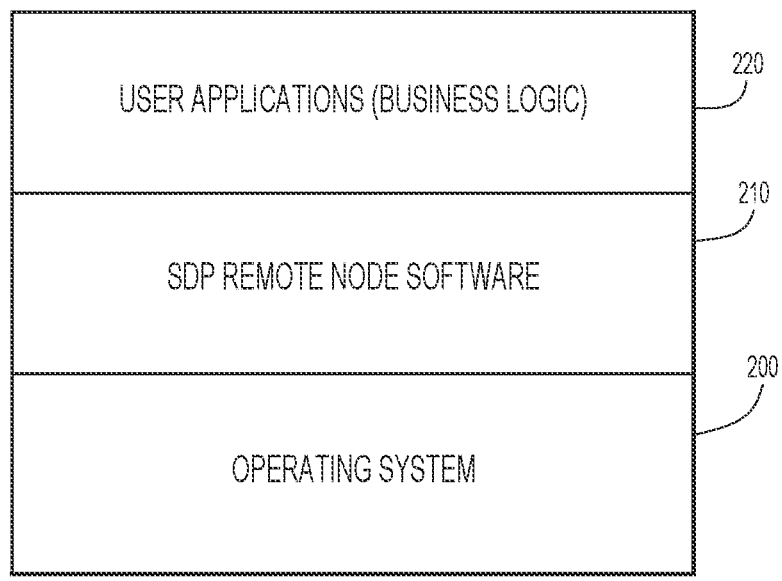
FIG. 4 illustrates a high-level software architecture diagram of an SDP remote node, according to an example embodiment.

Reference is now made to FIG. 4 which shows a high-level functional diagram of a remote node, shown generally at reference numeral 115(i). The remote node 115(i) may any of a variety of types of hosting environment, such as a virtual machine (VM), Docker container or bare metal. From a software functionality standpoint, the remote node consists of an operating system 200, SDP remote node software 210 that is created by the central node and installed on the remote node in order to enable it to function as an SDP remote node in the SDP system, and user applications (business logic) 220. The SDP remote node software 210 occupies the middle layer between the hosting operating system 200 and the deployed application logic (user business logic) 220 to provide the platform capabilities of SDP.

Crowdsourcing into SDP Data Lake

The methods and systems embedded into the SDP system address the aforementioned challenges associated with data lakes. The SDP enables crowdsourcing of data onboarding using a process that is interactive, intuitive and provides governing/controlling of important functions such as verification, acceptance and execution.

Generally, the process involves ingesting and transforming data sets with native formats and schemas into one SDP data format and one SDP data schema. The SDP platform provides numerous data connectors to ingest data, both in streaming and bulk, from most of the common message bus systems, database and data lakes technologies.

Profile data sets using custom-built data quality indicators are then used to assess in real-time (as new data is ingested into the platform) the conformity, completeness, integrity and other quality aspects of such data. Real-time data quality reports are accessible via SDP Data catalogs and are automatically updated and refreshed.

A data anonymization and masking service of the SDP automatically discovers "data entities" from onboarded data sets which may contain Personal Identifiable Information (PID) that enterprises may consider confidential/sensitive and not for public disclosure. Examples of automatically discovered PID are entities like Internet Protocol/Media Access Control (IP/MAC) addresses and phone numbers, customer and partner names, business affiliation/association, postal codes, usernames and passwords, etc. The SDP masking service operates on the discovered PID and applies masking techniques based on predefined user role-based access control policies.

The onboarded data is catalogued to ease data set discovery, data set understanding and accelerate hence its adoption enterprise-wide. The SDP system leverages input information during the data onboarding process to automate the creation of data connectors for ingesting and exposing data sets (data connector templatization). The data onboarding process unifies (format and schema) and catalogs (one single pane of glass across) data sets which are persisted in other data lakes or data repositories without requiring those data sets to be physically migrated into the new data lake.

SDP Data Onboarding Service Via an Intuitive, Interactive, Guided Workflow Enabling Crowdsourcing/Acceleration with Full Governance Control The data integration process is executed by an SDP data onboarding and management component (described below in connection with FIG. 7). This component interacts with the users who want to onboard their data sets via a simple and guided graphical user interface (GUI)-based workflow that walks the users step-by-step from connecting to the remote third-party system where the data resides to the final persistency of the unified and enriched data into the SDP data lake. Throughout this process, the user can select which data sets or data attributes to import, which entities to mask and what to keep publicly available, which rules to apply to profile the quality of the data to the final selection of the SDP data lake repository (Hadoop Distributed File System (HDFS), Hbase™ Hadoop database by Apache, relational database management system (RDBMS), etc.) where to persist the data.

Figure 5:
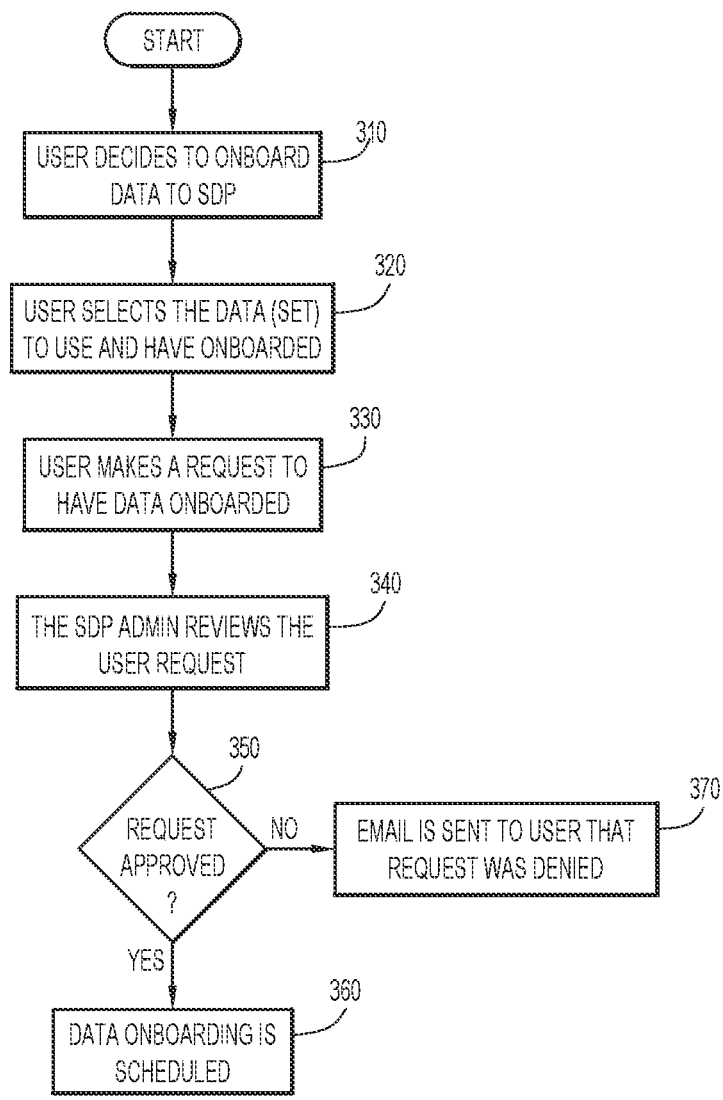
FIG. 5 illustrates a flow diagram of a governance process for completion and submission of a data onboarding request, according to an example embodiment.

The entire workflow may be governed by an SDP Administrator that reviews, approves and schedules or declines a user-initiated request to onboard a data set. FIG. 5 shows a high-level flow diagram for a governance process 300 that is bootstrapped upon the successful completion and submission of a data onboarding request. The user may be an authorized administrator associated with a remote node where the data to be onboarded is managed. At 310, a user (associated with a remote node at which the data resides) decides to onboard data to the SDP. At 320, the user selects the data (set) to use and have onboarded. At 330, the user makes a request to the central node of the SDP to have the data onboarded. At 340, an SDP administrator reviews the user request. At 350, the SDP administrator can approve or deny the request. If the request is approved, then at 360, the data is scheduled for onboarding. If the request is denied, at 370, an email or other notification indicating that the request is denied is sent to the user who made the request.

Figure 6:
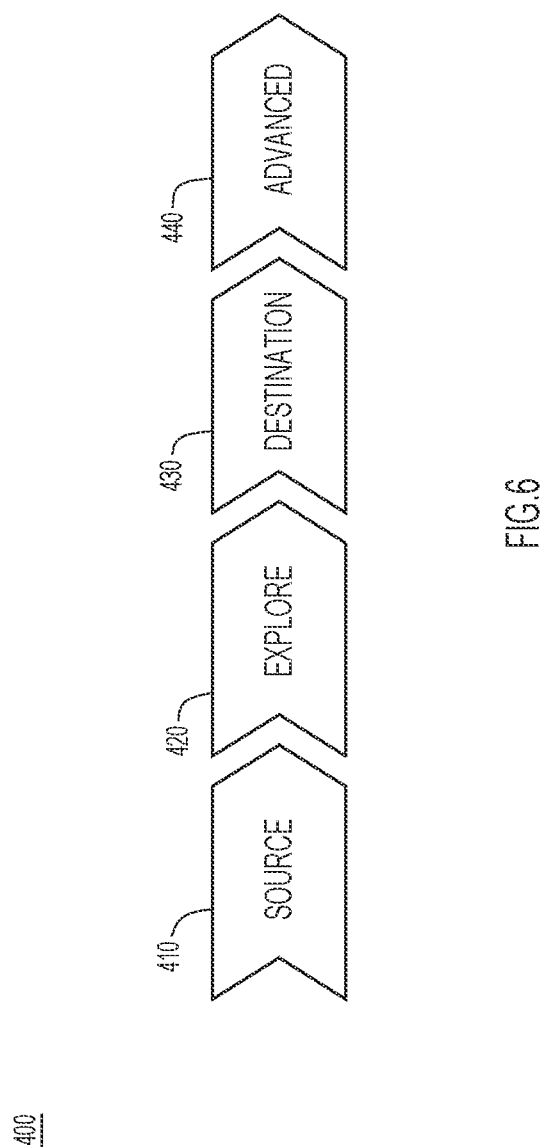
FIG. 6 depicts a logical view of the data onboarding process, according to an example embodiment.

The data onboarding process is composed by four interactive steps initiated with the creation of a new data onboarding request, as shown in FIG. 6. During this process, the SDP central node collects information by interacting with the user. At 410, the central node obtains all required information about the data source (where the original dataset is persisted) repository, such as database type (e.g., RDBMS, File System, Apache Cassandra™, Splunk™, ElasticSearch™, etc.). At 420, the central node explores and obtains information about the source schema and data sets of the source data. At 430, the central node obtains information about the destination preferences, such as HDFS, Hbase, etc., and the mapping scheme that describes a transformation from a native scheme to the SDP unified scheme object. At 440, the central node obtains additional "advanced" information, such as quality rules definitions, taxonomy enforcement, masking, etc.

Figure 7:
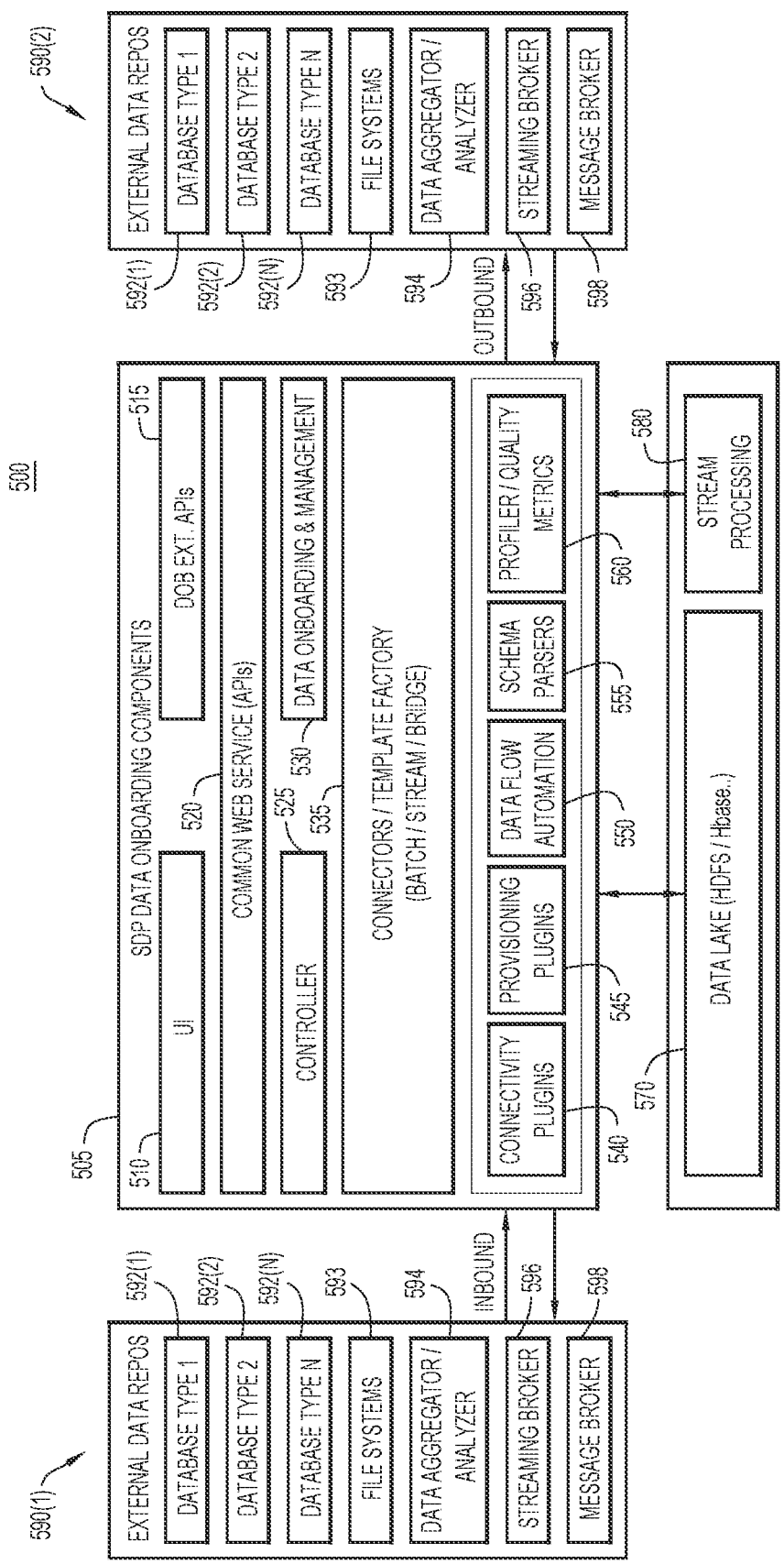
FIG. 7 illustrates an architectural view of the functional components of the data onboarding process, according to an example embodiment.

FIG. 7 shows a logical software architecture 500 of data onboarding components 505. As shown in FIG. 7, The SDP data onboarding components include a User Interface (UI) component, data onboarding (DOB) extensions and Application Programming Interfaces (APIs) 515, Common Web Service (CWS) functional component 520, a controller component 525, data onboarding and management component 530, a connectors/template factory component 535, connectivity plugins 540, provisioning plugins 545, a data flow automation component 550 (such as Apache NiFi™), schema parsers 555, and a profiler/quality metrics component 560. The data onboarding components communicate with the data lake 570 and stream processing function/component 580, such as Apache Kafka™. The data lake 570 may take the form of an HDFS or Hbase database platform.

FIG. 7 also shows external data repositories (repos) 590(1) and 590(2). Each external data repository may include one or more database types 592(1)-592(N), file systems 593, data aggregator/analyzer 594, a streaming broker 596 and a message broker 598. In the example shown in FIG. 7, external data repository 590(1) is an inbound data source and external data repository is an outbound data repository.

Users who wish to onboard new data sets into the SDP platform interact with the SDP system using an intuitive and guided workflow by the UI component 510 or by invoking programmatic APIs supported by the underneath Common Web Service functional component 520. As the user enters the requested information to onboard the new data set, the controller 525 invokes several functional components, each to execute specific functions as described below.

The data onboarding and management module 530 validates all user-entered configurations (required as part of the data onboarding request), checks the connectivity to the external repository by interacting with the connectivity plugins module 540. The schema parsers module 555 facilitates the reading and interpretation of the data persisted in the external repository and enables the user to precisely select which data sets to onboard (e.g., specific tables) or even to restrict the onboarding to only specific data attributes data sets attributes (specific columns or rows of the tables).

Upon the approval of the data onboarding request, the controller 525 automatically creates a data set tile into the SDP data catalog. This is useful for an enterprise that is part of the SDP system to discover, understand and explore the data assets in the system.

The data onboarding run-time instance is instantiated after a request is approved by the governance process. The controller 525 looks up in the connectors/template factory 535 for instantiating the correct data flow based on the provided user configurations.

Instantiation of a template will result in the creation of the corresponding data transfer flow on the underneath data flow automation framework 550 (e.g., Apache NiFi) which is responsible for transferring the actual data from the external source repository to the selected SDP destination repository and to apply data transformations if and when required/selected.

The profiler/quality metric functional component 560 runs on the new data as soon the data is persisted in the SDP data repository and calculates several quality metrics about the data being ingested. This process is repeated every time a new snippet of the data set is onboarded (which can be instantiated by the user or by a time-scheduler). As the new quality metrics are computed, the SDP system then pushes them to the catalog to ensure that the data set tile shows always the latest information about the quality of each data set.

With reference now to FIGS. 8A-8D, the step-by-step data onboarding process is now described.

During the first step 600 depicted in FIG. 8A, the SDP central node collects the data source repository information such as repository type (File System, RDBMS, etc.), host, credentials, schema etc., and tests the connectivity establishment between the SDP platform and the source data repository. In this example, at 602 the selected repository type is "Relational," at 604 the database driver is "Oracle," at 605 the connection string is as indicated in FIG. 8A, at 606 the user name is "IBNG_APPL," and at 608 the source scheme name is "CORE_FNZ_ADMIN".

Figure 8B:
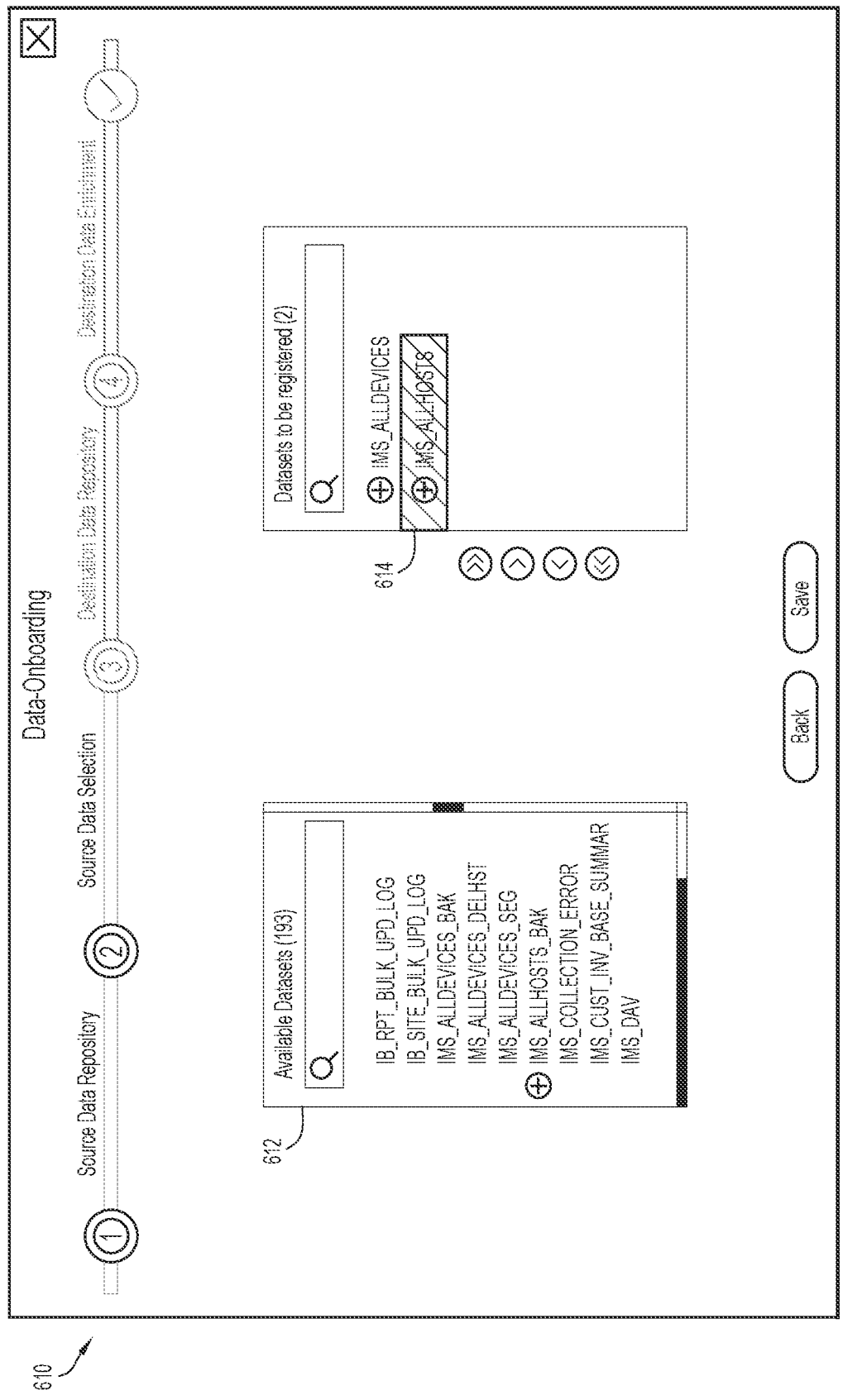

In the second step 610 shown in FIG. 8B, the SDP central node parses the schema of the source repository and requests the user to select which data set to onboard and where to persist the data set into the SDP data lake. In this example, as shown at 612, there are numerous available data sets. At 614, one of the data sets has been selected to be registered.

In the third step 620 shown in FIG. 8C, the user is requested to select where to store the data into the SDP data lake. At 622, the data storage format is selected, and at 624, the destination storage type is selected. The destination path is entered at 626. Finally, as indicated at 628, the central node of the SDP system has already mapped the original data schema to the unified data schema used by the SDP system to later operate on the onboarded data.

Figure 8D:
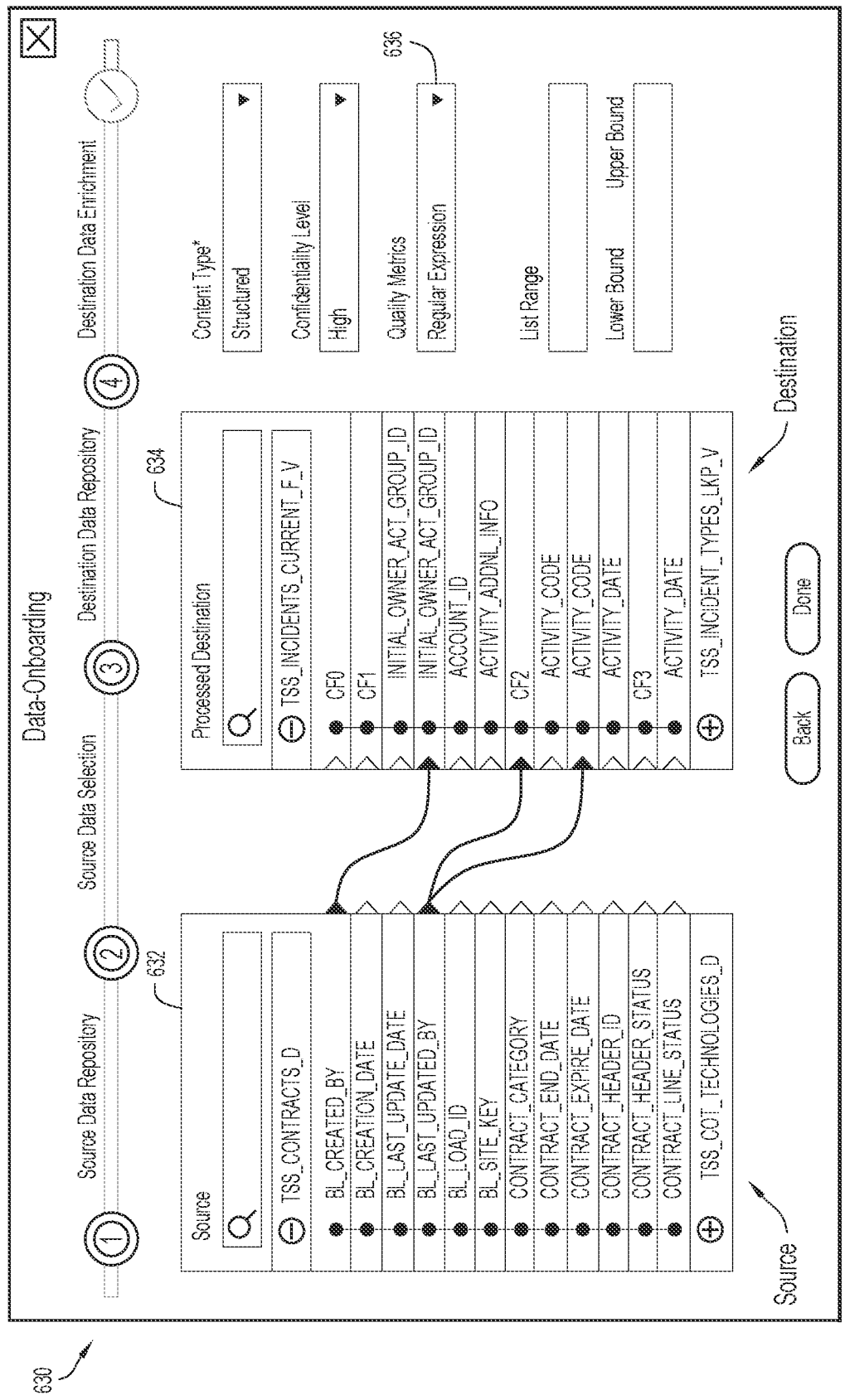

In the last step 630, illustrated in FIG. 8D, the user can review the data set as it will be onboarded into the SDP system from the source data repository shown at 632 to the destination data repository shown at 634, decide which data set or data set attribute to mask, and at 636 define quality rules to be executed every time increment of the data onboarded into the SDP platform. The Confidentiality Level determines whether an attribute needs to be masked or not. Data confidentiality is defined, for example, using one of "Public", "Confidential", "Highly Confidential" and "Restricted". Upon the completion of this step, the user can finally submit the request for onboarding the data set. An SDP administrator will review, approve and schedule the frequency at which the data will be onboarded into the SDP. At this step, the user can also invoke advanced services like the SDP data taxonomy services which allow the user to adhere to an enterprise-wise defined taxonomy. The taxonomy can either be uploaded by the SDP system administrator (if the enterprise has a taxonomy already defined) or can be auto-generated by the SDP central node calling a data threading service (if no taxonomy has been defined yet by the enterprise). As an example of a taxonomy, Network Device Inventory data is collected from different sources/fields, where one of the field is IP Address. "IP Address" name could be referenced differently at each source (IPAddress, IPV4, IPv6, IP_Address, etc.). All of these could be mapped to one term defined "IP Address" defined by the taxonomy. When users are viewing the data set definition, they can view the definition using a common reference term that is well defined as part of enterprise taxonomy.

Based on quality rules defined by the user, the system will apply these rules on data that is transferred and measure quality metrics. For example, the user may choose to apply a certain regular expression on an IP address field, and the system will apply this regular expression rule on the data of this field and determine the percentage of records that are compliant to given regular expression. Consumers of the data can make appropriate data usage decisions based on these metrics provided by the platform.

Figure 9:
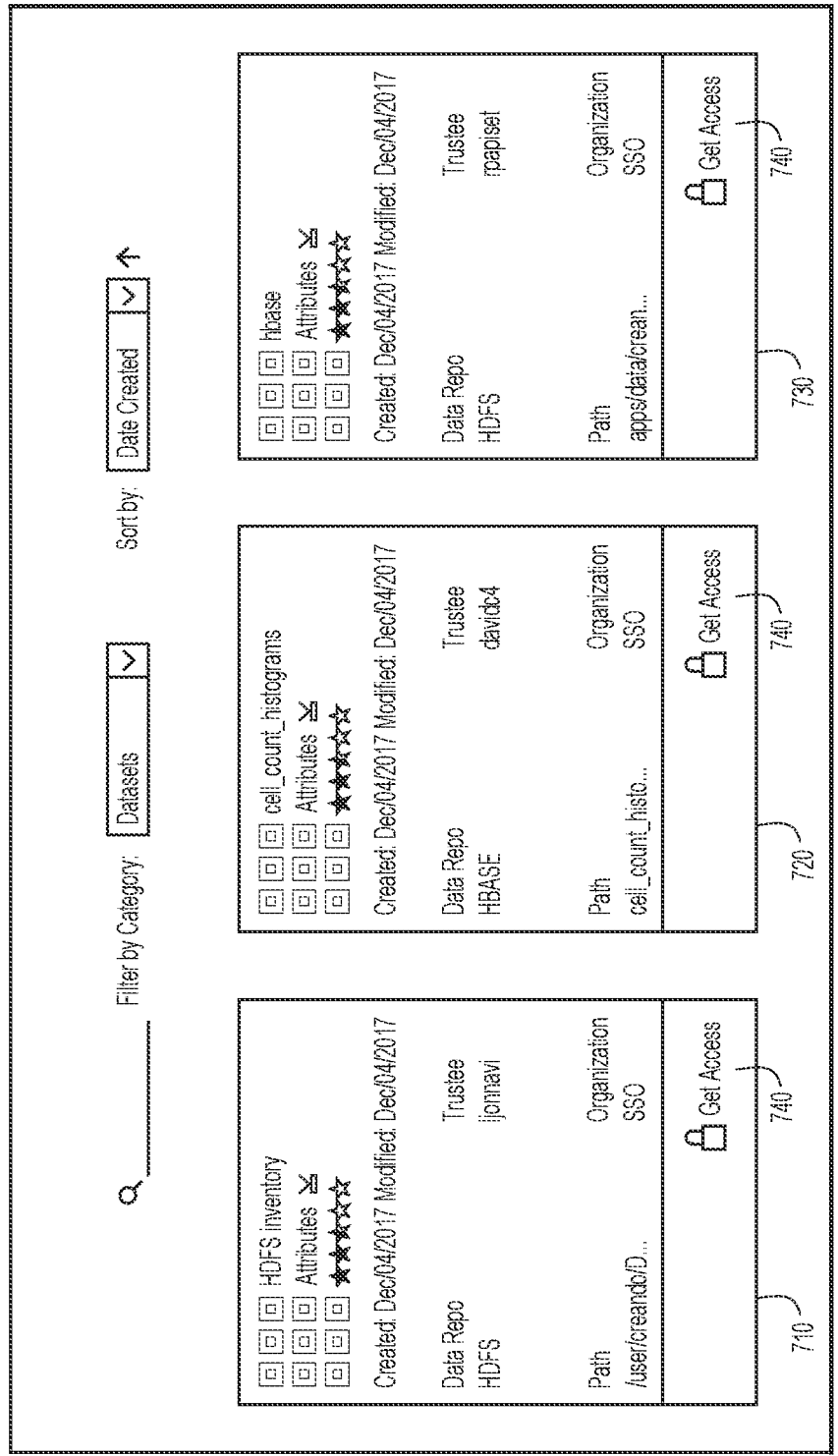
FIG. 9 is a diagram illustrating examples of a data catalog, according to an example embodiment.

As soon as the data onboarding request is approved, it will be scheduled for execution and when executed, the SDP system will automatically create a data set tile into the SDP catalog. FIG. 9 shows examples of graphical elements in the form of tiles that represent data sets in a catalog 700. A tile 710 is shown that is for a data set called "HDFS inventory," a tile 720 is shown that is for a data set called "cell_count_histograms," and a tile 730 is shown that is for a data set called "hbase."

SDP system users can browse, search/filter the data sets available in the SDP catalog (both streams and data sets), review the associated metadata (size, columns, number of attributes), review the corresponding quality metrics (defined during the onboarding process), and can submit the request for data access directly from the SDP GUI portal by clicking the "lock" icon shown at 740 in each data tile. This will trigger a mini SDP workflow between the user and the trustee/custodian of the requested data set for granting access to the data.

The SDP Data Onboarding Process with Templatized Connectors

When a data onboarding request is initiated for on-demand or scheduled execution, the data onboarding functional component instantiates a data flow connector that will start the actual data transfer from the selected source repository to the selected destination repository (as depicted in FIGS. 8A and 8B). The data flow connector is created automatically based on the configuration retrieved during the data onboarding request process.

To highlight the uniqueness of this process, consider by contrast, starting with a scenario where the user himself has to handle all the steps involved to create a proper connector (without the SDP data lake onboarding methods presented herein). Assume that the user wants to transfer data persisted in an external NoSQL data repository formatted in JSON and wants to transfer such data to an Hbase repository. To accomplish this task, the user needs to create a data flow for an end-to-end data transfer which includes the steps:

Find list of JSON files at given file path (including recursive directories)

Read JSON data from each file

Split the file into individual JSON records (at scale)

Parse a set of attributes (one or more) from each JSON record that forms a row identifier (also called as rowKey) and build value for the row identifier.

Form respective insert statements and ingest into HBase

The SDP data onboarding process removes all the complexity from this user interaction. The SDP data onboarding process automates the process by automatically creating the end-to-end data flow, leveraging the information populated by the user during the onboarding process, which information is used to configure/connect to both source and destination repositories, to understand the format of the data of both end systems (Common Separated Value (CSV), JSON etc.,), to execute any operation on the data itself like reading, writing, transformation of schema, selection and filtering based on specific criteria or identifiers embedded into the data, and so on.

Figure 10:
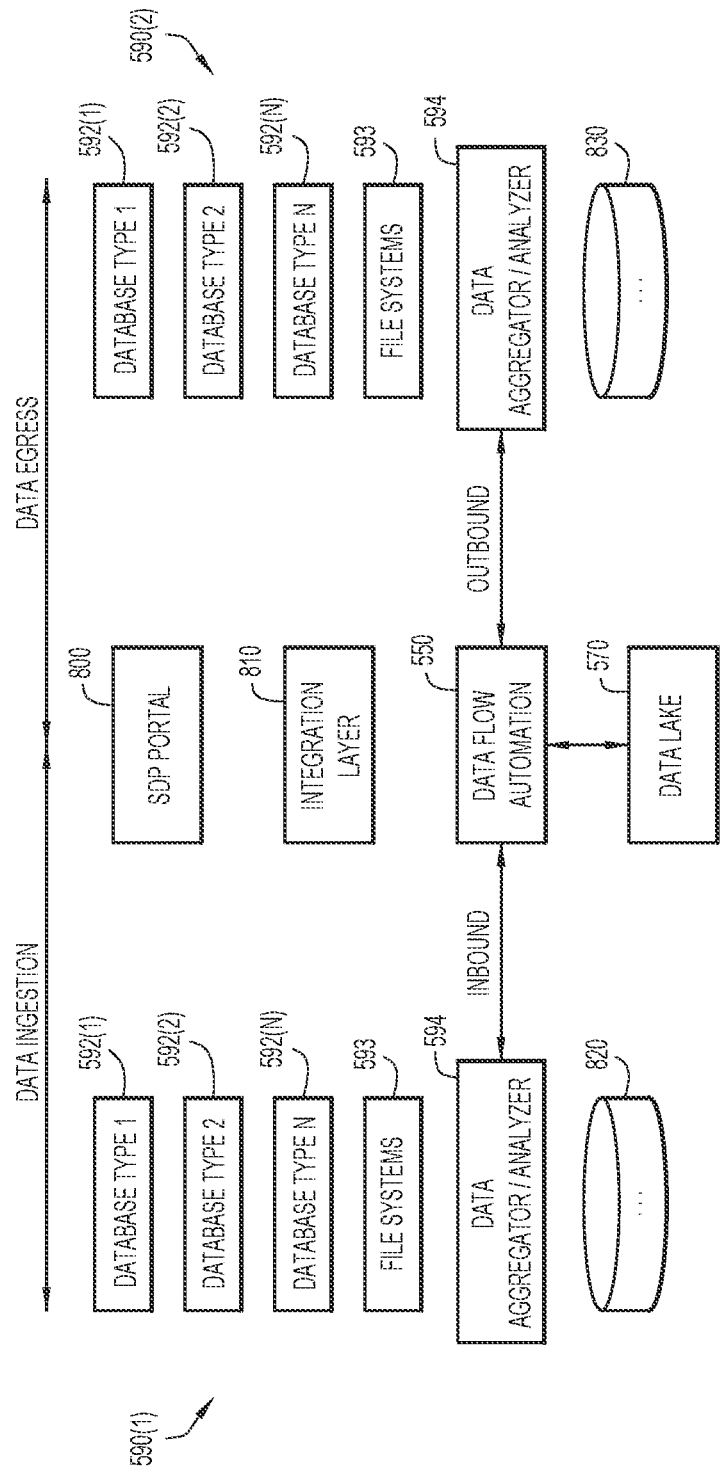
FIG. 10 illustrates a logical view of a connectors framework used for data ingestion in the data onboarding process, according to an example embodiment.

FIG. 10 illustrates a logical view of the connectors framework for data ingestion. On the left side of FIG. 10, the data repository 590(1) to be ingested is shown, and on the right side, the egress data repository 590(2) is shown. Between the two repositories are an SDP portal 800, an integration layer 810, the data flow automation component 550 (such as Apache NiFi), and the SDP data lake 570. The SDP portal 800 is the user interface by which a user onboards data, as depicted in FIGS. 8A-8D, for example. The integration layer 810 performs a template instantiation process described below in connection with FIG. 11. FIG. 10 further shows a source storage device 820 for the data associated with the source data repository 590(1) and a destination storage device 830 associated with the egress data repository 590(2).

One unique aspect of this architecture is the concept of a data flow connector (template factory) and underlying connectivity plugins. The components abstract the complexities related to the actual data movement and data transformations. The data onboarding process management architecture in the SDP system makes the system storage technology agnostic, meaning that the underlying data lake technology can be "plug-and-play" at the time of deployment. The end-to-end flow of instantiation of data flow connectors is shown FIG. 11.

Figure 11:
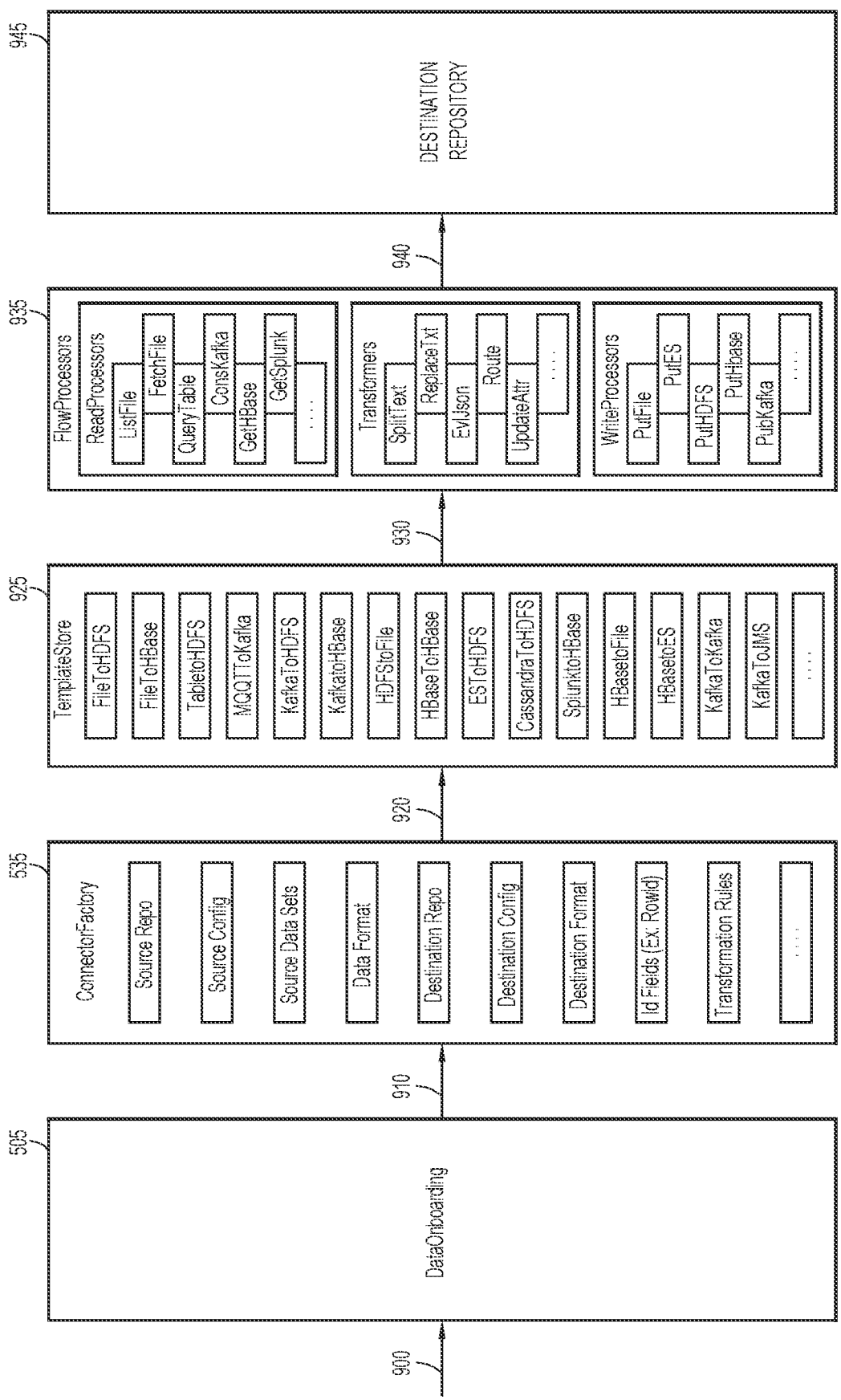
FIG. 11 is a diagram illustrating an end-to-end instantiation of data flow connectors, according to an example embodiment.

After the data onboarding request is approved by the data onboarding component 505, the SDP administrator initiates the runtime at 900 for the approved data onboarding request. At 910, the connector factory 535 uses various configuration parameters from the data onboarding request to select most suitable data flow template from template store. Examples of the various configuration parameters used by the connector factory 535 include source repository (repo), source configuration (config), source data sets, data format, destination repository, destination format, Id fields (identifier fields used to identify a record in a data set) and transformation rules. At 920, the connector factory instantiates the template 925 with necessary run-time configurations. Examples of the run-time configurations are indicated in FIG. 11. Run-time configurations may include user name, password, host information, etc.

As shown at 930, instantiating the template 925 results in creating an end-to-end data flow connector with the necessary data flow processors. (Read, Transform and Write) shown at 935, creating the needed relationships (success, fail, conditional etc.,) between processors and configure/overwrite each processor with user provided run-time parameters. At 935, each box represents an example processor that does a specific task, such as read data, list data sets, write, transform, etc. "Read Processors" are mostly used to read data from source data repositories and list available data sets. "Transformers" are used to update data for further processing, such as extracting data of identifier fields and building a composite key, splitting into individual records, etc. "Write Processors" are used to write the data to a destination data repository.

Once started (either by the administrator or by a time-based scheduler), the data transfer from the source repository(ies) to the destination repository(ies) 945 is automatically performed.

This architecture works at scale to support various source and destination repositories including Relational, File System (NFS, SFTP, HDFS), NoSQL (HBase, Cassandra), Elastic Search, Splunk (batch storage technologies), Kafka, RabbitMQ, MQQT, ActiveMQ (stream data sources). This framework also supports various data formats including JSON, CSV, and Avro™ data serialization system by Apache. This architecture may be extended to support other additional repositories as needed by adding additional templates and instantiation logic.

The data onboarding process presented herein enables crowdsourcing data at scale from various parts of the enterprises using a consistent guided process. This process allows domain experts to provide all necessary information including quality rules, metadata, taxonomy etc., which will enhance adoption of the data with more insightful information about the data.

Registering Third-Party Datasets into SDP: Unification and Cataloging

Large enterprises have more than one repository and data lakes for managing data. Traditionally users in the enterprises interact with respective business units or individual team members to learn about available data sets, access and exploration. This results in inconsistent data governance, privacy and protection policies across the organization.

The SDP system solves this problem by enabling various groups in the enterprises to publish their data sets into a SDP universal catalog and keep the storage in their own data lakes. Various groups in the enterprises can use standardized schema and APIs provided by the SDP to publish their data sets into the SDP data catalog. The SDP system processes these requests and publishes these data sets into the SDP data catalog for data discovery and exploration. Users can either connect with respective groups for obtaining access to those data sets or use data onboarding flows in the SDP system to bring data into a common data lake so that they can access and perform policy management within the SDP system.

Figure 12:
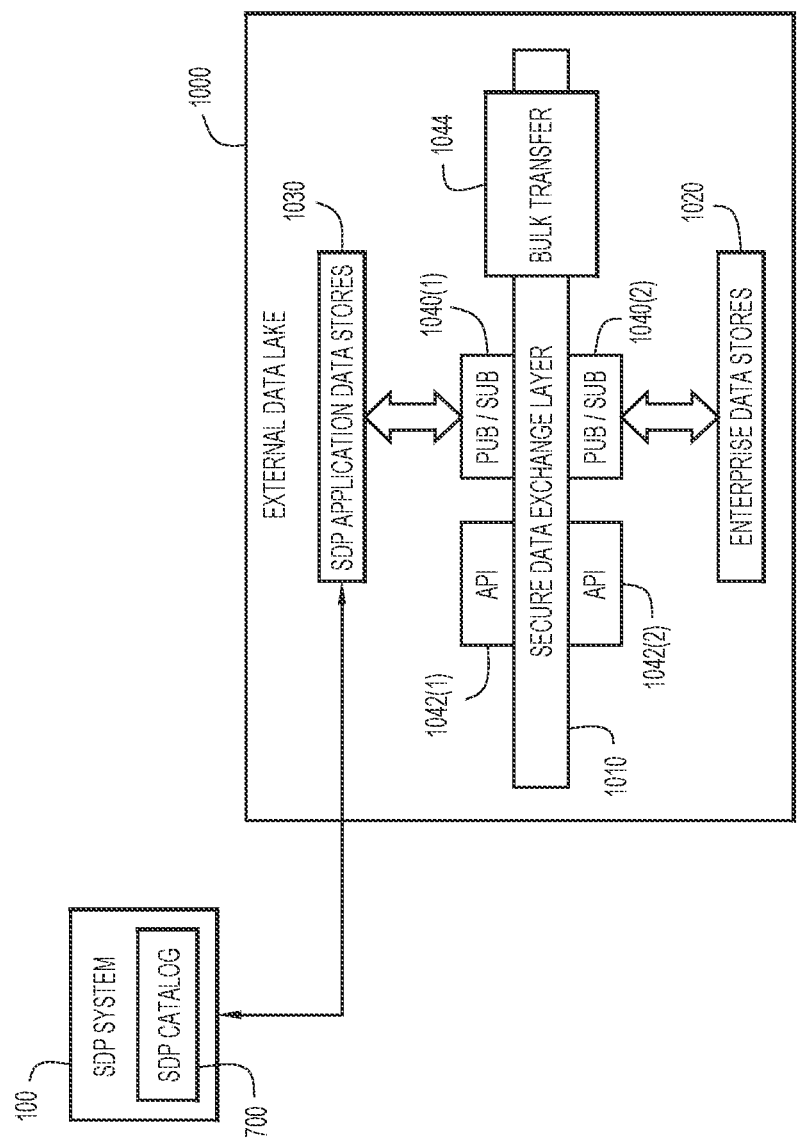
FIG. 12 is a diagram illustrating a deployment scenario by which data sets are discovered and published from third party data lakes, according to an example embodiment.

The SDP provides a mini GUI workflow for publishing third party data sets into SDP catalogs. Also, third party data lakes can use SDP externalized APIs to publish their data sets into catalogs. FIG. 12 depicts how a third party data lake 1000 that is external to the SDP system 100 can integrate with the SDP system 100 and publish its data sets. The external data lake 1000 is configured a secure data exchange layer 1010 that enables connectivity between enterprise data stores 1020 where one or more data sets are stored with SDP application data stores 1030. A publish/subscribe (pub/sub) mechanism is provided as shown at 1040(1) and 1040(2) to enable this connectivity, along with APIs 1042(1) and 1042(2). The secure data exchange layer 1010 can also support bulk transfer as shown at 1044. Communication, shown at 1050, is established between the SDP catalog 700 of the SDP system 100 and the SDP application data stores 1030 to allow for catalog integration, policy integration and data flow for a processing pipeline for the external data lake 1000. In this way, the SDP system 100 enables the external data lake 1000 to publish data sets into the SDP catalog 700 to promote the adoption of the data sets to consumers of the SDP system. In the event that SDP system users see these data sets and need to access to them, the SDP users work with external data lake 1000 to bring the data into SDP system 100 for processing.

Figure 13:
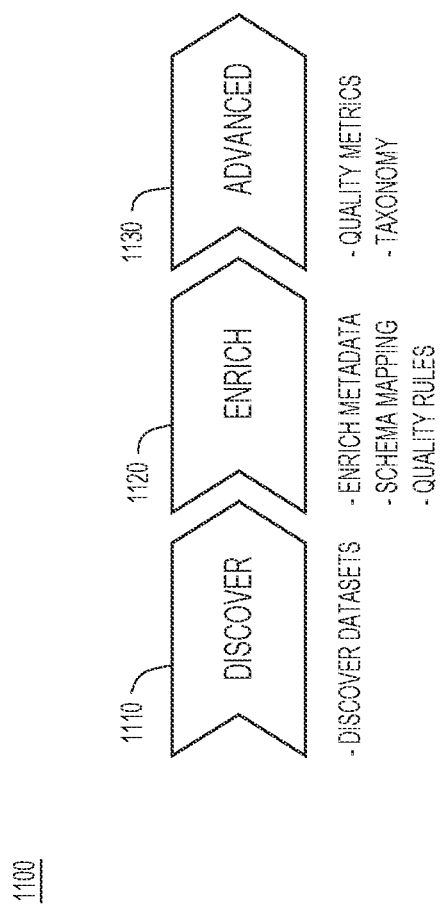
FIG. 13 is a diagram of a workflow that is initiated by a user to discover and publish data sets from third party data lakes, according to an example embodiment.

FIG. 13 illustrates the mini-workflow that is initiated by the user to discover and publish data sets from a third party data lake. During this process, the SDP system collects, by interacting with the user, all the required information about the data repository (where the dataset is persisted), unified schema of data sets, quality rule definitions, taxonomy enforcement, masking etc.

During the first step 1110, the SDP system discovers and collects the data sets information such as repository type (HDFS, Hbase, etc.), host, credentials, schema, etc., and tests the connectivity establishment between the SDP and the source data repository. The SDP system discovers all datasets from given data lake storage, and the user is asked to select one or more data sets to be published into the SDP catalog.

At 1120, an enrich operation is provided by which additional processing may be performed, including schema mapping and specifying quality rules to be executed every time increment of the data will be onboarded into the SDP system. Upon the completion of this step, the user can finally submit the request of data publishing the data sets to the administrator who will review, approve.

At 1130, the user can also invoke advanced services, like the taxonomy services which allow the user to adhere to an enterprise-wise defined taxonomy. Upon approval, the SDP system initiates parsing of the schema and catalogs all published data sets and makes them available on SDP catalog portal.

Figure 14:
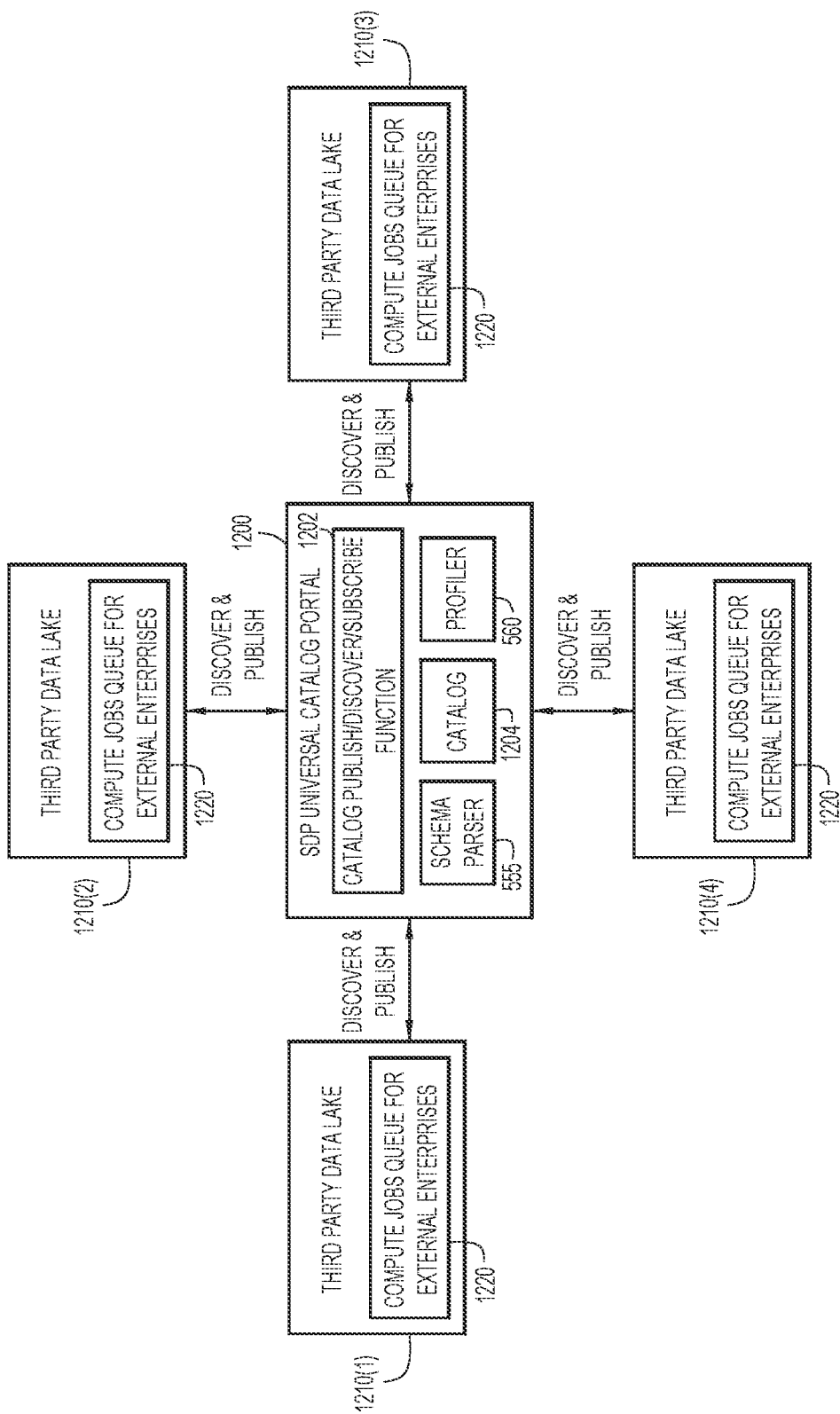
FIG. 14 illustrates a deployment scenario for metadata discovery and publishing of data sets from external data lakes, according to an example embodiment.

The deployment model depicted in the FIG. 14 illustrates a process of publishing data sets from various external data lakes to the SDP universal catalog, while still allowing for management of access and policy locally by the respective external data lake as per its own governance model. FIG. 14 shows the SDP universal catalog portal 1200 and a plurality of third party data lakes 1210(1)-1210(4). The SDP universal catalog portal 1200 includes a catalog publish/discover/subscribe function 1202, schema parser 555 (shown in FIG. 7), a catalog 1204 and a profile function 560 (shown in FIG. 7). Each of the external (third party) data lakes 1210(1)-1210(4) include a compute jobs queue (for external enterprises) 1220.

In this model, external data lakes 1210(1)-1210(4) use the SDP externalized APIs implemented by the catalog publish/discover/subscribe function 1202 to publish selective data sets into the SDP universal catalog 1204. The schema parser 555 parses the schema submitted through the APIs and persists the metadata into universal catalog 1204. The SDP catalog 1204 provides an option to onboard these external datasets into the SDP data lake, as described above in connection with FIG. 5.

This approach enables the SDP universal catalog portal 1200 to be a marketplace of data catalogs and can offer a "Data Brokerage Service" by creating a marketplace for data assets. Using this service, enterprises can publish/discover/subscribe data sets using secure APIs of the Data Brokerage Service. Enterprises can monetize their data/portion of their data (anonymized) by subscribing to the Data Brokerage Service.

Figure 15:
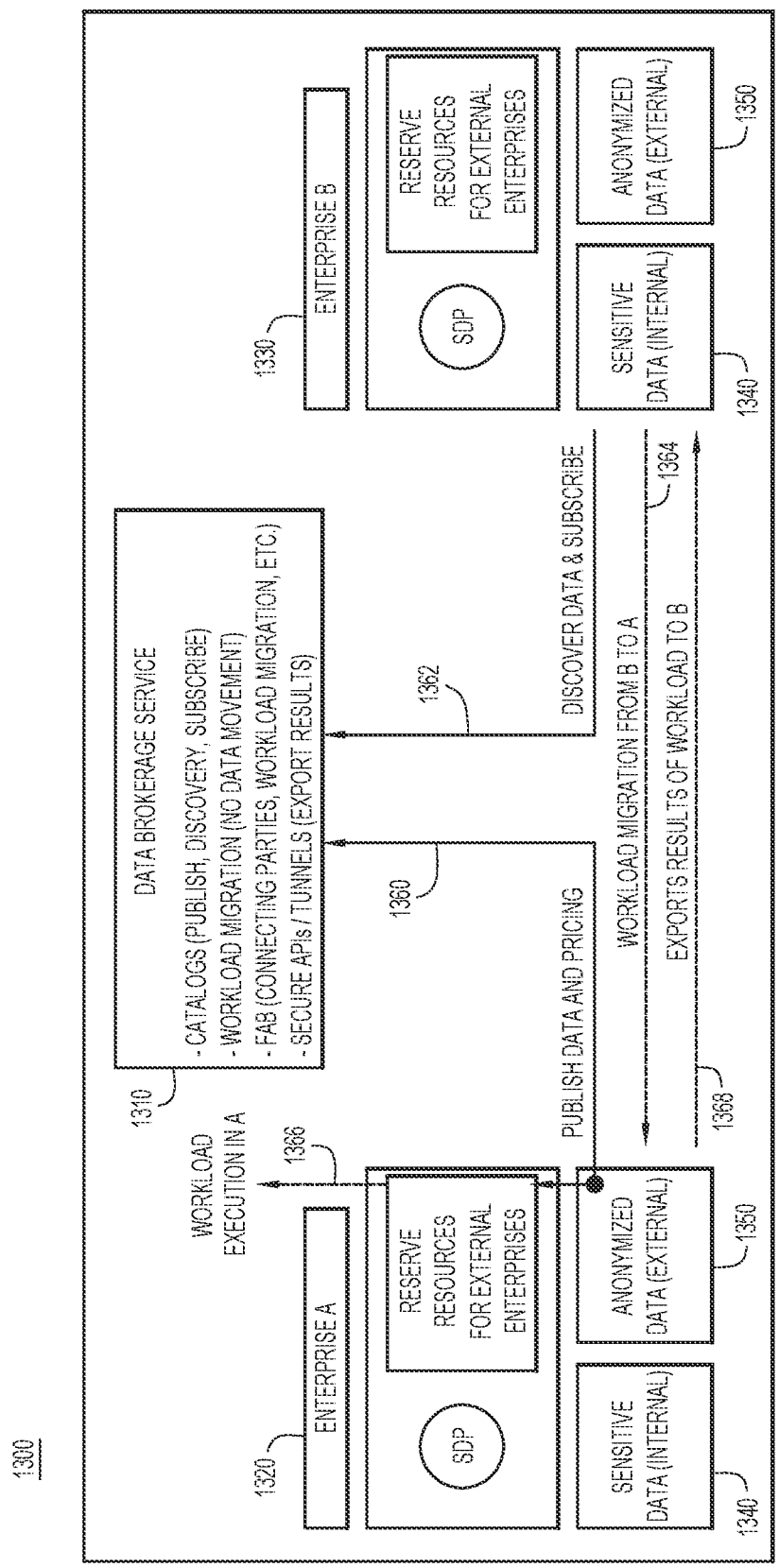
FIG. 15 is a diagram depicting operations of a data brokerage service, according to an example embodiment.

To this end, reference is now made to FIG. 15. FIG. 15 shows a system 1300 in which a data brokerage service 1310 is provided. In the example shown in this figures, data associated with a first enterprise, enterprise A shown at 1320, is to be published and offered to the data brokerage service 1310, and a second enterprise, enterprise B shown at 1330, is interested in using the data from the first enterprise 1320. The data brokerage service 1310 is a service/function of the SDP system, and it performs several functions, including maintaining data catalogs (publish, discover, subscribe functions), workloads migration (without data movement), Fulfillment, Assurance and Billing (FAB) (connecting parties, workload migration, etc.) and Secure APIs/Tunnels (to export results).

Each of the enterprises 1320 and 1330 has sensitive data 1340 (for internal use by that enterprise only) and anonymized data 1350 (for external use). The operation flow of the system 1300 is as follows. Enterprises publish data assets into a universal SDP catalog using secure APIs, each data asset will be have an associated price tag, published unified schema powered by the SDP system and access mechanisms. This is shown at 1360 in FIG. 15, where enterprise A publishes to the data brokerage service 1310 data and pricing about some portion of its anonymized data 1350. Consuming enterprises can discover these data sets from the SDP universal data catalog (via the data brokerage service 1310). Consumers can subscribe and checkout required data assets. Consumers can run any processing jobs on this data. For example, as shown at 1362, enterprise B discovers data published by enterprise A and subscribes to it via the data brokerage service 1310. At 1364, the data brokerage service 1310 initiates a workload migration from enterprise B to enterprise A. At 1366, workload execution is performed in enterprise A using the data 1350, but on behalf of enterprise B. At 1368, results of the workload execution are returned to enterprise B.

Overall, the SDP data onboarding process has numerous advantages.

Universal Data Catalog: Every data set that is ingested into the data lake gets cataloged in the system. Users can search a data catalog for any data they need without the need to directly communicate to the data owners. The data catalog provides all the necessary metadata, metrics about the data and ability to request for access to the data, etc. This will simplify the life of data scientists in accessing necessary data and use their time in discovering insights.

Avoid data duplication: Given data source information and data sets to be ingested, the system will automatically check if that data is already available in the system. The system will inform the data onboarding user about the availability of the same data and avoid creating any duplicate data sets.

Data Quality: Every data set that gets ingested will be profiled to calculate various quality metrics (duplicate records, null percentages, min/max/avg, topn, range, custom data validations etc.). An application runs continuously that will apply various quality rules on all incoming data and calculate various metrics about the data. This will help the user community to choose right qualitative data sets and make informed decisions about data.

Taxonomy: Often, the names of data sets and fields are cryptic/coded. Each data owner could name the same field differently (Ex: IP Address, IP_Address, IPv4 etc.). Applying a corporate taxonomy will standardize and enable to find references. For example, users can easily search for network device information in the data lake, independent of storage and data sources, and choose right data sets.

Extensible Connectors: The SDP system supports a variety of connectors which can do the work of bringing data into a data lake or publish data from a data lake using configurations provided by data domain experts. These connectors are extensible and a number of connectors can grow easily based on new data repositories to be supported.

Navigational Mapping Schema: Each data set in the data lake gets cataloged and the system provides navigational mapping schema to data consumers for any data set that needs to be consumed. Navigational mapping schema (NM Schema) is a standard representation of metadata of a given data set independent of data source and storage. Using the NM Schema, application users can programmatically understand data and access it.

Figure 16:
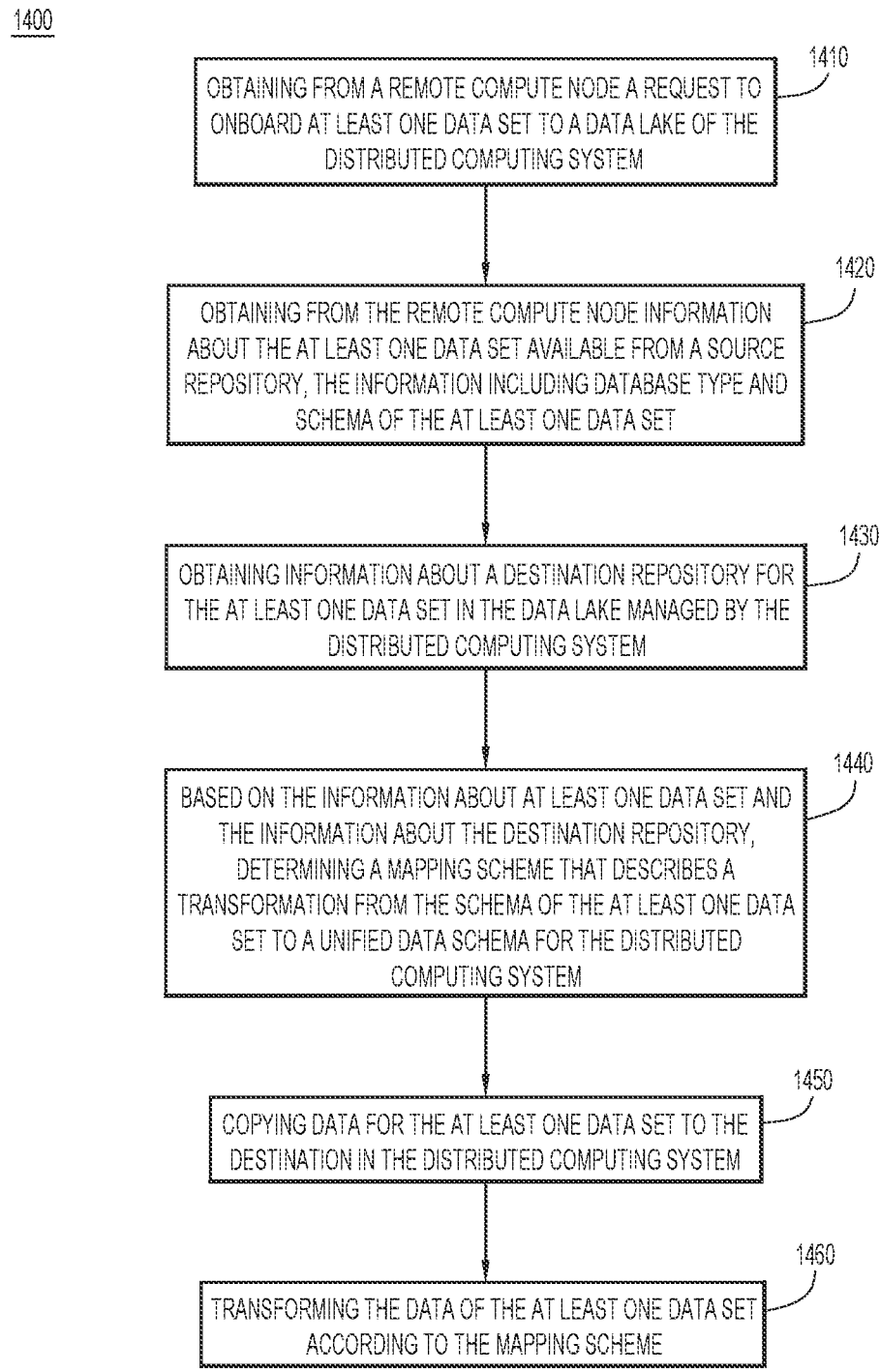
FIG. 16 is a high-level flow chart depicting a data onboarding process, according to an example embodiment.

Reference is now made to FIG. 16. FIG. 16 shows a flow chart of a method 1400 performed at a central node in a distributed computing system that includes a plurality of remote compute nodes whose computing resources and software functions are made available in a platform agnostic matter to users of the distributed computing system. At 1410, the central compute node obtains a request from a remote compute node to onboard at least one data set to a data lake of the distributed computing system. At 1420, the central compute node obtains information obtained from the remote compute node about the at least one data set available from a source repository, the information including database type and schema of the at least one data set. At 1430, the central compute node obtains information about a destination repository for the at least one data set in the data lake managed by the distributed computing system. At 1440, based on the information about at least one data set and the information about the destination repository, the central compute node determines a mapping scheme that describes a transformation from the schema of the at least one data set to a unified data schema for the distributed computing system. At 1450, the central compute node copies the data for the at least one data set to the destination in the distributed computing system. At 1460, the central compute node transforms the data of the least one data set according to the mapping scheme for storage in the destination repository.

FIG. 17 illustrates a hardware block diagram of a computing or networking entity/device 1500 that may be a central compute node 110 or remote compute node 115(1)-115(N). It should be appreciated that FIG. 17 provides only an illustration of one embodiment and does not imply any limitations with regard to the environments in which different embodiments may be implemented. Many modifications to the depicted environment may be made.

As depicted, the device 1500 includes a bus 1512, which provides communications between computer processor(s) 1514, memory 1516, persistent storage 1518, communications unit 1520, and input/output (I/O) interface(s) 1522. Bus 1512 can be implemented with any architecture designed for passing data and/or control information between processors (such as microprocessors, communications and network processors, etc.), system memory, peripheral devices, and any other hardware components within a system. For example, bus 1512 can be implemented with one or more buses.

Memory 1516 and persistent storage 1518 are computer readable storage media. In the depicted embodiment, memory 1516 includes random access memory (RAM) 1524 and cache memory 1526. In general, memory 1516 can include any suitable volatile or non-volatile computer readable storage media.

One or more programs may be stored in persistent storage 1518 for execution by one or more of the respective computer processors 1514 via one or more memories of memory 1516. The persistent storage 1518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1518 may also be removable. For example, a removable hard drive may be used for persistent storage 1518. Other examples include optical and magnetic disks, thumb drives, and smart cards that are inserted into a drive for transfer onto another computer readable storage medium that is also part of persistent storage 1518.

Communications unit 1520, in these examples, provides for communications with other data processing systems or devices. In these examples, communications unit 1520 includes one or more network interface cards. Communications unit 1520 may provide communications through the use of either or both physical and wireless communications links.

I/O interface(s) 1522 allows for input and output of data with other devices that may be connected to computer 1500. For example, I/O interface 1522 may provide a connection to external devices 1528 such as a keyboard, keypad, a touch screen, and/or some other suitable input device. External devices 1528 can also include portable computer readable storage media such as database systems, thumb drives, portable optical or magnetic disks, and memory cards.

Software and data used to practice embodiments can be stored on such portable computer readable storage media and can be loaded onto persistent storage 1518 via I/O interface(s) 1522. I/O interface(s) 1522 may also connect to a display 1530. Display 1530 provides a mechanism to display data to a user and may be, for example, a computer monitor.

The programs described herein may be identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, read only memory (ROM), floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed at a central compute node in a distributed computing system that includes a plurality of remote compute nodes whose computing resources and software functions are made available in a platform agnostic matter to users of the distributed computing system, the method comprising: obtaining from a remote compute node a request to onboard at least one data set to a data lake of the distributed computing system; obtaining from the remote compute node information about the at least one data set available from a source repository, the information including database type and schema of the at least one data set; obtaining information about a destination repository for the at least one data set in the data lake managed by the distributed computing system; based on the information about at least one data set and the information about the destination repository, determining a mapping scheme that describes a transformation from the schema of the at least one data set to a unified data schema for the distributed computing system; copying data for the at least one data set to the destination repository in the distributed computing system; and transforming the data of the at least one data set according to the mapping scheme.

In another form, an apparatus is provided comprising: a communication interface configured to enable network communications between a central compute node in a distributed computing system and a plurality of remote compute nodes in whose computing resources and software functions are made available in a platform agnostic matter to users of the distributed computing system; one or more processors coupled to the communication interface, wherein the one or more processors are configured to perform operations including: obtaining from a remote compute node a request to onboard at least one data set to a data lake of the distributed computing system; obtaining from the remote compute node information about the at least one data set available from a source repository, the information including database type and schema of the at least one data set; obtaining information about a destination repository for the at least one data set in the data lake managed by the distributed computing system; based on the information about at least one data set and the information about the destination repository, determining a mapping scheme that describes a transformation from the schema of the at least one data set to a unified data schema for the distributed computing system; copying data for the at least one data set to the destination repository in the distributed computing system; and transforming the data of the at least one data set according to the mapping scheme.

In still another form, one or more computer readable storage media are provided encoded with software comprising computer executable instructions and when the software is executed operable to perform operations at a central compute node in a distributed computing system that includes a plurality of remote compute nodes whose computing resources and software functions are made available in a platform agnostic matter to users of the distributed computing system, the operations including: obtaining from a remote compute node a request to onboard at least one data set to a data lake of the distributed computing system; obtaining from the remote compute node information about the at least one data set available from a source repository, the information including database type and schema of the at least one data set; obtaining information about a destination repository for the at least one data set in the data lake managed by the distributed computing system; based on the information about at least one data set and the information about the destination repository, determining a mapping scheme that describes a transformation from the schema of the at least one data set to a unified data schema for the distributed computing system; copying data for the at least one data set to the destination repository in the distributed computing system; and transforming the data of the at least one data set according to the mapping scheme.

The aforementioned operations may further include: obtaining information about quality rules for data in the at least one data set; applying the quality rules on data for the at least one data set that is copied; and generating quality metrics ever time increment of the data onboarded according to the quality rules.

Moreover, the operations may further include: obtaining information about a taxonomy associated with data for the at least one data set; and managing storage of the data for the data set to the destination in the data lake based on the taxonomy.

The operations may still further include generating for display a graphical element that indicates availability of the at least one data set in a catalog of data sets in the data lake available for use.

The copying operation may include: automatically creating an end-to-end data flow between the source repository and the destination repository; and executing one or more operations on data in the data set, including reading, writing, schema transforming, and filtering based on criteria or identifiers included in the data.

The operations may still further include: serving a catalog portal that includes a publish/discovery/subscriber service with respect to a plurality of external data lakes; publishing data sets into a catalog managed by the catalog portal; and parsing schemas associated with the data sets into metadata stored in the catalog. Furthermore, the operations may further include: storing a plurality of data catalogs associated with data from a plurality of enterprises, wherein data of at least a first enterprise is separated into sensitive data for internal use only and anonymized data for external use; obtaining from a second enterprise a request for the data of the first enterprise; initiating a workload migration from the second enterprise to the first enterprise where a workload is executed at the first enterprise on the anonymized data of the first enterprise; and returning results of the workload executed at the first enterprise to the second enterprise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed at a central compute node in a distributed computing system that includes a plurality of remote compute nodes whose computing resources and software functions are made available in a platform agnostic matter to users of the distributed computing system, the method comprising:
    obtaining, from a remote compute node, a request to onboard at least one data set to a data lake of the distributed computing system;
    obtaining, from the remote compute node, information about the at least one data set available from a source repository, the information including database type of the source repository and schema of the at least one data set;
    obtaining information about a destination repository for the at least one data set in the data lake managed by the distributed computing system;
    based on the information about at least one data set and the information about the destination repository, determining a mapping scheme that describes a transformation from the schema of the at least one data set to a unified data schema for the distributed computing system;
    copying data for the at least one data set to the destination repository in the distributed computing system;
    transforming the data of the at least one data set according to the mapping scheme;
    storing a plurality of data catalogs associated with data from a plurality of enterprises, wherein data of at least a first enterprise is separated into sensitive data for internal use only and anonymized data for external use;
    obtaining, from a second enterprise, a request for the data of the first enterprise;
    initiating a workload migration from the second enterprise to the first enterprise, wherein a workload is executed at the first enterprise on the anonymized data of the first enterprise; and
    returning results of the workload executed at the first enterprise to the second enterprise.

2. The method of claim 1, further comprising:
    obtaining information about quality rules for data in the at least one data set;
    applying the quality rules on data for the at least one data set that is copied; and
    generating quality metrics, every time the data is onboarded according to the quality rules.

3. The method of claim 1, further comprising:
    obtaining information about a taxonomy associated with data for the at least one data set; and
    managing storage of the data for the data set to the destination in the data lake based on the taxonomy.

4. The method of claim 1, further comprising generating for display a graphical element that indicates availability of the at least one data set in a catalog of data sets in the data lake available for use.

5. The method of claim 1, wherein copying includes:
automatically creating an end-to-end data flow between the source repository and the destination repository; and
executing one or more operations on data in the data set, including reading, writing, schema transforming, and filtering based on criteria or identifiers included in the data.

6. The method of claim 1, further comprising:
serving a catalog portal that includes a publish/discovery/subscriber service with respect to a plurality of external data lakes;
publishing data sets into a catalog managed by the catalog portal; and
parsing schemas associated with the data sets into metadata stored in the catalog.

7. The method of claim 1, further comprising:
obtaining advanced information including one or more of quality rule definitions, taxonomy enforcement definitions, and masking definitions.

8. An apparatus comprising:
a communication interface configured to enable network communications between a central compute node in a distributed computing system and a plurality of remote compute nodes in whose computing resources and software functions are made available in a platform agnostic matter to users of the distributed computing system; and
one or more processors coupled to the communication interface, wherein the one or more processors are configured to perform operations including:
obtaining, from a remote compute node, a request to onboard at least one data set to a data lake of the distributed computing system;
obtaining, from the remote compute node, information about the at least one data set available from a source repository, the information including database type of the source repository and schema of the at least one data set;
obtaining information about a destination repository for the at least one data set in the data lake managed by the distributed computing system;
based on the information about at least one data set and the information about the destination repository, determining a mapping scheme that describes a transformation from the schema of the at least one data set to a unified data schema for the distributed computing system;
copying data for the at least one data set to the destination repository in the distributed computing system;
transforming the data of the at least one data set according to the mapping scheme;
storing a plurality of data catalogs associated with data from a plurality of enterprises, wherein data of at least a first enterprise is separated into sensitive data for internal use only and anonymized data for external use;
obtaining, from a second enterprise, a request for the data of the first enterprise;
initiating a workload migration from the second enterprise to the first enterprise, wherein a workload is executed at the first enterprise on the anonymized data of the first enterprise; and
returning results of the workload executed at the first enterprise to the second enterprise.

9. The apparatus of claim 8, wherein the one or more processors are configured to further perform operations including:
obtaining information about quality rules for data in the at least one data set;
applying the quality rules on data for the at least one data set that is copied; and
generating quality metrics, every time the data is onboarded according to the quality rules.

10. The apparatus of claim 8, wherein the one or more processors are configured to further perform operations including:
obtaining information about a taxonomy associated with data for the at least one data set; and
managing storage of the data for the data set to the destination in the data lake based on the taxonomy.

11. The apparatus of claim 8, wherein the one or more processors are configured to further perform operations including generating for display a graphical element that indicates availability of the at least one data set in a catalog of data sets in the data lake available for use.

12. The apparatus of claim 8, wherein the one or more processors are configured to perform the copying by:
automatically creating an end-to-end data flow between the source repository and the destination repository; and
executing one or more operations on data in the data set, including reading, writing, schema transforming, and filtering based on criteria or identifiers included in the data.

13. The apparatus of claim 8, wherein the one or more processors are configured to further perform operations including:
serving a catalog portal that includes a publish/discovery/subscriber service with respect to a plurality of external data lakes;
publishing data sets into a catalog managed by the catalog portal; and
parsing schemas associated with the data sets into metadata stored in the catalog.

14. The apparatus of claim 8, wherein the one or more processors are configured to further perform operations including:
obtaining information including one or more of quality rule definitions, taxonomy enforcement definitions, and masking definitions.

15. One or more computer readable storage media encoded with software comprising computer executable instructions and when the software is executed operable to perform operations at a central compute node in a distributed computing system that includes a plurality of remote compute nodes whose computing resources and software functions are made available in a platform agnostic matter to users of the distributed computing system, the operations including:
obtaining, from a remote compute node, a request to onboard at least one data set to a data lake of the distributed computing system;
obtaining, from the remote compute node, information about the at least one data set available from a source repository, the information including database type of the source repository and schema of the at least one data set;
obtaining information about a destination repository for the at least one data set in the data lake managed by the distributed computing system;
based on the information about at least one data set and the information about the destination repository, determining a mapping scheme that describes a transformation from the schema of the at least one data set to a unified data schema for the distributed computing system;

copying data for the at least one data set to the destination repository in the distributed computing system;

transforming the data of the at least one data set according to the mapping scheme;

storing a plurality of data catalogs associated with data from a plurality of enterprises, wherein data of at least a first enterprise is separated into sensitive data for internal use only and anonymized data for external use;

obtaining from a second enterprise a request for the data of the first enterprise;

initiating a workload migration from the second enterprise to the first enterprise, wherein a workload is executed at the first enterprise on the anonymized data of the first enterprise; and returning results of the workload executed at the first enterprise to the second enterprise.

16. The one or more computer readable storage media of claim 15, further comprising instructions operable for:

obtaining information about quality rules for data in the at least one data set;

applying the quality rules on data for the at least one data set that is copied; and generating quality metrics, every time the data is onboarded according to the quality rules.

17. The one or more computer readable storage media of claim 15, further comprising instructions operable for:

obtaining information about a taxonomy associated with data for the at least one data set; and managing storage of the data for the data set to the destination in the data lake based on the taxonomy.

18. The one or more computer readable storage media of claim 15, further comprising instructions operable for:

serving a catalog portal that includes a publish/discovery/subscriber service with respect to a plurality of external data lakes;

publishing data sets into a catalog managed by the catalog portal; and parsing schemas associated with the data sets into metadata stored in the catalog.

19. The one or more computer readable storage media of claim 15, further comprising instructions operable for:

obtaining information including one or more of quality rule definitions, taxonomy enforcement definitions, and masking definitions.

20. The one or more computer readable storage media of claim 15, further comprising instructions operable for:

generating for display a graphical element that indicates availability of the at least one data set in a catalog of data sets in the data lake available for use.

* * * * *